(12) United States Patent
Noguchi et al.

(10) Patent No.: US 12,552,745 B2
(45) Date of Patent: Feb. 17, 2026

(54) COMPOUND FOR OPTICAL MATERIALS, CURABLE COMPOSITION, CURED BODY, AND OPTICAL ARTICLE

(71) Applicant: TOKUYAMA CORPORATION, Shunan (JP)

(72) Inventors: Takao Noguchi, Shunan (JP); Katsuhiro Mori, Shunan (JP); Junji Momoda, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 399 days.

(21) Appl. No.: 17/927,852

(22) PCT Filed: May 25, 2021

(86) PCT No.: PCT/JP2021/019862
§ 371 (c)(1),
(2) Date: Nov. 25, 2022

(87) PCT Pub. No.: WO2021/241596
PCT Pub. Date: Dec. 2, 2021

(65) Prior Publication Data
US 2023/0286912 A1   Sep. 14, 2023

(30) Foreign Application Priority Data

May 28, 2020 (JP) .................. 2020-093225
Mar. 16, 2021 (JP) .................. 2021-041935

(51) Int. Cl.
| | |
|---|---|
| C07C 323/52 | (2006.01) |
| C07C 321/04 | (2006.01) |
| C08G 18/38 | (2006.01) |
| C08G 65/334 | (2006.01) |
| C08J 7/04 | (2020.01) |
| C08K 5/00 | (2006.01) |
| C08L 75/08 | (2006.01) |
| C09D 175/08 | (2006.01) |
| C09J 175/08 | (2006.01) |
| C09K 9/02 | (2006.01) |
| C08G 18/24 | (2006.01) |
| C08G 18/48 | (2006.01) |
| G02B 5/23 | (2006.01) |
| G02C 7/10 | (2006.01) |

(52) U.S. Cl.
CPC .......... *C07C 323/52* (2013.01); *C07C 321/04* (2013.01); *C08G 18/3868* (2013.01); *C08G 65/3344* (2013.01); *C08J 7/04* (2013.01); *C08K 5/0041* (2013.01); *C08L 75/08* (2013.01); *C09D 175/08* (2013.01); *C09J 175/08* (2013.01); *C09K 9/02* (2013.01); *C08G 18/246* (2013.01); *C08G 18/3876* (2013.01); *C08G 18/4829* (2013.01); *C08J 2375/08* (2013.01); *C08J 2475/08* (2013.01); *C09K 2211/1018* (2013.01); *G02B 5/23* (2013.01); *G02C 7/10* (2013.01)

(58) Field of Classification Search
CPC ... C07C 323/52; C07C 321/04; C08K 5/0041; C08G 18/246; C08G 18/3876; C08G 18/4829; C08L 75/08
See application file for complete search history.

(56) References Cited

U.S. PATENT DOCUMENTS

| | | |
|---|---|---|
| 4,166,172 A | 8/1979 | Klein |
| 4,929,693 A | 5/1990 | Akashi et al. |

(Continued)

FOREIGN PATENT DOCUMENTS

| | | |
|---|---|---|
| CN | 110914322 A | 3/2020 |
| CN | 111004380 A | 4/2020 |

(Continued)

OTHER PUBLICATIONS

Chinese Office Action and Search Report for corresponding Chinese Application No. 202180038223.5, dated Apr. 7, 2024, with partial English translation.

(Continued)

*Primary Examiner* — Michael L Leonard
(74) *Attorney, Agent, or Firm* — Birch, Stewart, Kolasch & Birch, LLP

(57) ABSTRACT

The present invention provides a novel compound for optical materials, and a curable composition, a cured body and an optical article containing the compound for optical materials. According to an embodiment, there is provided a compound for optical materials represented by Formula (Ia) below:

[CF 1]

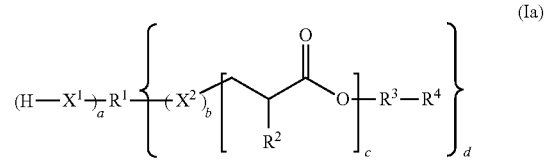

In Formula (Ia), $X^1$ and $X^2$ are each NH, S, or O. $R^1$ is a 1- to 30-valent organic residue. $R^3$ is a group composed of a polymer having a repeating unit selected from the group consisting of $-(CH_2)_mO-$, $-(CH_2CH_2O)-$, $-(CH(CH_3)CH_2O)-$, $-(CH_2CH(CH_3)O)-$, $-(C(=O)-CH_2CH_2CH_2CH_2CH_2O)-$, $-(C(=O)-O-CH_2CH_2CH_2CH_2CH_2O)-$, and $-(C(=O)-O-CH_2CH_2CH_2CH_2CH_2CH_2O)-$, a random copolymer having at least two repeating units selected from the group, or a block copolymer having at least two repeating units selected from the group.

12 Claims, No Drawings

(56) References Cited

U.S. PATENT DOCUMENTS

| | | |
|---|---|---|
| 5,166,345 A | 11/1992 | Akashi et al. |
| 6,224,945 B1 | 5/2001 | Calderara |
| 11,472,943 B2 | 10/2022 | Ito et al. |
| 2009/0095345 A1 | 4/2009 | Murakami et al. |
| 2011/0262492 A1 | 10/2011 | Messersmith et al. |
| 2014/0027684 A1 | 1/2014 | Evans et al. |
| 2015/0152322 A1 | 6/2015 | Nakayama et al. |
| 2018/0312643 A1 | 11/2018 | Shimizu et al. |
| 2020/0071467 A1 | 3/2020 | Shimizu et al. |
| 2021/0032532 A1 | 2/2021 | Miyazaki et al. |

FOREIGN PATENT DOCUMENTS

| | | |
|---|---|---|
| EP | 3 527 597 A1 | 8/2019 |
| JP | 1-152182 A | 6/1989 |
| JP | 4-114033 A | 4/1992 |
| JP | 5-213637 A | 8/1993 |
| JP | 10-338869 A | 12/1998 |
| JP | 2003-506734 A | 2/2003 |
| JP | 2008-506031 A | 2/2008 |
| JP | 2008-274245 A | 11/2008 |
| JP | 2009-40946 A | 2/2009 |
| JP | 2009-96042 A | 5/2009 |
| JP | 2014-3045 A | 1/2014 |
| JP | 2015-25063 A | 2/2015 |
| JP | 2017-052869 A | 3/2017 |
| JP | 2018-21161 A | 2/2018 |
| JP | 2019-127450 A | 8/2019 |
| JP | 2019-182866 A | 10/2019 |
| JP | 2019-215450 A | 12/2019 |
| TW | 201406844 A | 2/2014 |
| WO | WO 2006/019435 A1 | 2/2006 |
| WO | WO 2014/007154 A1 | 1/2014 |
| WO | WO 2016/143910 A1 | 9/2016 |
| WO | WO 2017/038865 A1 | 3/2017 |
| WO | WO 2019/013249 A1 | 1/2019 |
| WO | WO 2019/022131 A1 | 1/2019 |

OTHER PUBLICATIONS

International Search Report for PCT/JP2021/019862 (PCT/ISA/210) mailed on Aug. 24, 2021.

Nair et al., "The Thiol-Michael Addition Click Reaction: A Powerful and Widely Used Tool in Materials Chemistry", Chemistry of Materials, 2014, vol. 26, pp. 724-744.

Extended European Search Report for corresponding European Application No. 21810901.5, dated Jun. 3, 2024.

Taiwanese Office Action and Search Report for corresponding Taiwanese Application No. 110119147, dated Nov. 4, 2024, with an English translation.

Japanese Office Action issued in Japanese Application No. 2022-526595, dated May 5, 2025, with partial English translation.

COMPOUND FOR OPTICAL MATERIALS, CURABLE COMPOSITION, CURED BODY, AND OPTICAL ARTICLE

TECHNICAL FIELD

The present invention relates to a compound for optical materials, a curable composition, a cured body, and an optical article.

BACKGROUND ART

Demand for photochromic glasses imparted with photochromic properties has been expanding worldwide. Photochromic glasses, which have lenses that change their transmittance depending on the surrounding brightness (amount of ultraviolet light), can provide optimum glare protection.

Recently, the development of plastic lenses with photochromic properties has been advanced. Such a photochromic lens is obtained, for example, by curing a polymerizable composition containing a photochromic compound that undergoes a structural change depending on the amount of ultraviolet light. In order to increase photochromic performance, a technique has been proposed in which the photochromic compound is made more dispersible in a cured body by being prevented from aggregation (Patent Documents 1 to 3).

PRIOR ART DOCUMENTS

Patent Documents

Patent Document 1: WO 2014/007154
Patent Document 2: JP-A 2008-506031
Patent Document 3: JP-A 1-152182

Non-Patent Documents

Non-Patent Document 1: Chem. Mater., 2014, 26, 724-744

SUMMARY OF THE INVENTION

Problems to be Solved by the Invention

It is an object of the present invention to provide a novel compound for optical materials, and a curable composition, a cured body and an optical article containing the compound for optical materials.

Means for Solving the Problems

The present invention encompasses the following inventions.

1. A compound for optical materials represented by Formula (Ia) below:

[CF 1]

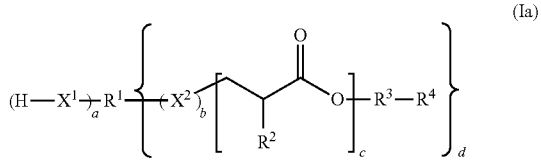

(Ia)

wherein $X^1$ and $X^2$ are each NH, S, or O;
$R^1$ is a 1- to 30-valent organic residue;
$R^2$ is H or $CH_3$;
$R^3$ is a group composed of a polymer having a repeating unit selected from the group consisting of
—$(CH_2)_mO$—,
—$(CH_2CH_2O)$—,
—$(CH(CH_3)CH_2O)$—,
—$(CH_2CH(CH_3)O)$—,
—$(C(=O)$—$CH_2CH_2CH_2CH_2CH_2O)$—,
$(C(=O)$—$O$—$CH_2CH_2CH_2CH_2CH_2O)$—, and
$(C(=O)$—$O$—$CH_2CH_2CH_2CH_2CH_2CH_2O)$—,
a random copolymer having at least two repeating units selected from the group, or
a block copolymer having at least two repeating units selected from the group;
$R^4$ is H,
$H_2C=CH$—$C(=O)$—,
$H_2C=C(CH_3)$—$C(=O)$—,
$H_2C=CH$—$C(=O)$—$OCH_2CH_2NHC(=O)$—,
$HS$—$CH_2$—$CH_2$—$C(=O)$—, or
a glycidyl group;
"a" is an integer of 0 to 29; "b" is 0 or 1; "c" is 0 or 1; "d" is an integer of 1 to 30; "a+d" is an integer of 1 to 30; and "m" is an integer of 3 to 20.

2. The compound for optical materials according to item 1 above, wherein $R^1$ is a monovalent, divalent, trivalent, tetravalent, or hexavalent organic residue.

3. The compound for optical materials according to item 1 above, wherein $R^1$ is an organic residue of a compound represented by Formula (IIIa), (IIIb), (IIIc) or (IIId) below:

(IIIa)

wherein "e" is 1 to 4, "f" is 0 to 3, and "e+f" is 4;

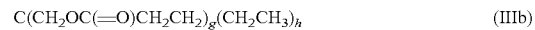

(IIIb)

wherein "g" is 1 to 4, "h" is 0 to 3, and "g+h" is 4;

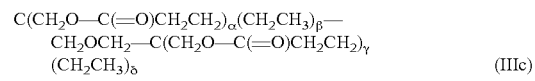

(IIIc)

wherein "α" is 0 to 3, "β" is 0 to 3, "α+β" is 3, "γ" is 0 to 3, "δ" is 0 to 3, "γ+δ" is 3, and "α±γ" is 1 to 6; or

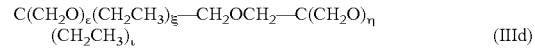

(IIId)

wherein "ε" is 0 to 3, "ξ" is 0 to 3, "ε+ξ" is 3, "η" is 0 to 3, "ι" is 0 to 3, "η+ι" is 3, and "ε+η" is 1 to 6.

4. The compound for optical materials according to item 1 above, wherein $R^1$ is an organic residue selected from the group consisting of Formulas (4c), (4b), (5d), (5a), (6h), (6a), and (6e) to be described below.

5. The compound for optical materials according to any one of items 1 to 4 above, wherein $R^3$ is a group composed of a block copolymer of a polymer having a repeating unit of —$(CH_2CH_2O)$— and a polymer having a repeating unit of $(CH_2CH(CH_3)O)$—.

6. The compound for optical materials according to any one of items 1 to 5 above, wherein $R^3$ is a group composed of a block copolymer represented by Formula (IIa) below:

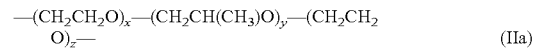

(IIa)

wherein "x" is an integer of 0 to 20, "y" is an integer of 5 to 40, and "z" is an integer of 1 to 20.

7. A curable composition comprising: a compound for optical materials (Component D) according to any one of items 1 to 6 above; and at least one compound (Component B) selected from the group consisting of a polyisocyanate compound and a polyisothiocyanate compound.

8. A curable composition comprising a compound for optical materials (Component D) according to item 7 above, wherein $R^4$ in Formula (Ia) is $H_2C=CH-C(=O)-$, $H_2C=C(CH_3)-C(=O)-$, or $H_2C=CH-C(=O)-OCH_2CH_2NHC(=O)-$.

9. The curable composition according to item 7 or 8 above, further comprising a photochromic compound (Component A).

10. A cured body obtained by curing a curable composition according to any one of items 7 to 9 above.

11. An optical article comprising a cured body according to item 10 above.

Effects of the Invention

The present invention provides a novel compound for optical materials, and a curable composition, a cured body and an optical article containing the compound for optical materials.

The photochromic cured body and the optical article containing the compound for optical materials of the present invention are excellent in photochromic properties such as the maximum absorption wavelength (λmax), the color optical density, and the fading half-life [$\xi_{1/2}$ (sec)], and also in color durability.

MODE FOR CARRYING OUT THE INVENTION

[Compound for Optical Materials]

A compound for optical materials according to an embodiment is represented by Formula (Ia) below.

[CF 2]

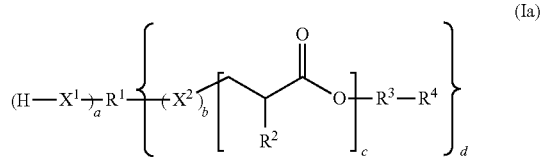

(Ia)

In Formula (Ia), $X^1$ and $X^2$ are each NH, S, or O. $X^1$ and $X^2$ are each preferably NH or S. When an amine compound which is obtained when $X^1$ and $X^2$ are NH, or a thiol compound which is obtained when $X^1$ and $X^2$ are S is used as a material, the durability and photochromic properties of a cured body to be obtained tends to increase. $X^1$ and $X^2$ are each more preferably S.

In the formula, "a" is an integer of 0 to 29. Here, "a" is preferably 0, 1, or 2, and more preferably 0. Further, "b" is 0 or 1. Preferably, "b" is 0. In other words, the use of a compound without S or NH tends to increase the durability and photochromic properties of a cured body to be obtained.

$R^1$ is a 1- to 30-valent organic residue. $R^1$ is preferably a 1-, 2-, 3-, 4-, 5-, 6-, 7-, or 10-valent organic residue, and more preferably a 2-, 3-, 4-, or 6-valent organic residue. Using a compound containing a higher-valent organic residue tends to result in a cured body with excellent photochromic properties. The organic residue will be described in detail later.

$R^2$ is H or $CH_3$. $R^2$ is preferably H.

In the formula, "c" is 0 or 1. Using the compound for optical materials in which "c" is 1, i.e., the compound with a structure indicated by the subscript c, tends to increase the durability of a cured body. Using the compound for optical materials in which "c" is 0, i.e., the compound without the structure indicated by the subscript c, tends to result in a cured body having both durability and photochromic properties.

$R^3$ is a group composed of a polymer having a repeating unit selected from the group consisting of
—$(CH_2)_mO$—,
—$(CH_2CH_2O)$—,
—$(CH(CH_3)CH_2O)$—,
—$(CH_2CH(CH_3)O)$—,
—$(C(=O)-CH_2CH_2CH_2CH_2CH_2O)$—,
—$(C(=O)-O-CH_2CH_2CH_2CH_2CH_2O)$—, and
—$(C(=O)-O-CH_2CH_2CH_2CH_2CH_2CH_2O)$—,
  a random copolymer having at least two repeating units selected from the aforementioned group, or
  a block copolymer having at least two repeating units selected from the aforementioned group. In the formula, "m" is an integer of 3 to 20. More preferably, "m" is an integer of 4 or more.

$R^3$ is a homopolymer having one repeating unit selected from the aforementioned group, a random copolymer having at least two repeating units selected from the aforementioned group, or a block copolymer having at least two repeating units selected from the aforementioned group.

$R^3$, which is a group composed of a polymer, is a flexible chain with a relatively flexible structure. In a cured body, a region close to the flexible chain $R^3$ tends to have higher flexibility. Accordingly, a compound that undergoes a structural change, such as a photochromic compound, located close to the flexible chain $R^3$ is less likely to be inhibited from undergoing a structural change. Thus, using the compound for optical materials containing the flexible chain $R^3$ according to the embodiment contributes to increasing the photochromic performance of a cured body. In the compound for optical materials according to the embodiment, the flexible chain $R^3$ is linked to the organic residue $R^1$ via the optional structures indicated by the subscripts "c" and "b". This makes it is easy to further increase the flexibility in a region close to the flexible chain $R^3$, and ensures long-term high durability.

$R^3$ is preferably a group composed of a polymer having a repeating unit selected from the group consisting of —$(CH_2CH_2O)$—, —$(CH_2CH(CH_3)O)$—, and —$(CH_2)_mO$—, a random copolymer having at least two repeating units selected from the aforementioned group, or a block copolymer having at least two repeating units selected from the aforementioned group. Using the compound for optical materials containing a polymer having a repeating unit of —$(CH_2CH_2O)$— tends to result in a cured body with excellent durability. Using the compound for optical materials containing a polymer having a repeating unit of —$(CH_2CH(CH_3)O)$— tends to result in a cured body with excellent photochromic properties. Using the compound for optical materials containing a polymer having a repeating unit of —$(CH_2)_mO$— tends to result in a cured body with excellent durability.

$R^3$ is preferably a group composed of a block copolymer of the polymer having a repeating unit of —$(CH_2CH_2O)$— and the polymer having a repeating unit of —$(CH_2CH(CH_3)O)$—. In this block copolymer, the polymer having a repeating unit of —$(CH_2CH_2O)$— is preferably located to face the organic residue $R^1$ via the polymer having a repeating unit of —(CH₂CH(CH₃)O)—, i.e., located on an outer side in the structural formula of the compound for optical materials. Using the compound for optical materials of this structure tends to further increase the durability of a cured body.

The number of repetitions of each of the repeating units is, for example, not less than 2 and not more than 30, preferably not less than 5 and not more than 20, more preferably 7 to 16, and still more preferably 7, 9, 10, 11, 12, 15, or 16. Using the compound for optical materials with a higher number of repetitions tends to result in a cured body with high photochromic properties. However, if the number of repetitions is too high, the durability and photochromic properties of a cured body are liable to decrease.

More preferably, $R^3$ is a group composed of a block copolymer represented by Formula (IIa) below. Using the compound for optical materials of this structure tends to increase the durability and photochromic properties of a cured body.

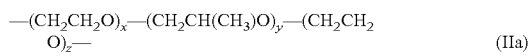
(IIa)

In Formula (IIa), "x" is an integer of 0 to 20; "y" is an integer of 5 to 40; and "z" is an integer of 1 to 20.

$R^4$ is H,
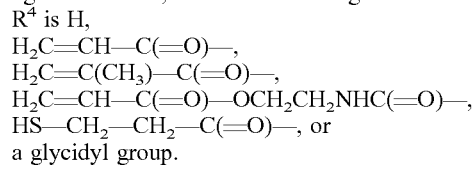
or
a glycidyl group.

The compound for optical materials obtained when $R^4$ is H is suitable as a material for a polyurethane-based resin.

The compound for optical materials obtained when $R^4$ is H₂C=CH—C(=O)—, H₂C=C(CH₃)—C(=O)—, or H₂C=CH—C(=O)—OCH₂CH₂NHC(=O)— is suitable as a material for a (meth)acrylic resin.

The compound for optical materials obtained when $R^4$ is HS—CH₂—CH₂—C(=O)— is suitable as a material for a polyurethane-based resin.

The compound for optical materials obtained when $R^4$ is a glycidyl group is suitable as a material for an epoxy resin or an acrylic resin.

In the formula, "d" is an integer of 1 to 30. Further, "a+d" is an integer of 1 to 30. For example, "d" is, 1, 2, 3, 4, 5, 6, or 7. The ratio (d/valence) of d to the valence of the organic residue $R^1$ is preferably not less than 0.5, more preferably not less than 0.8, and still more preferably 1. In other words, it is preferable that a bond of the organic residue $R^1$ is bonded to a structure indicated by the subscript "d" at a higher rate. When the flexible chain $R^3$ accounts for a higher proportion in the compound for optical materials, the durability and photochromic properties of a cured body to be obtained tend to increase.

In the compound for optical materials according to the embodiment, the organic residue $R^1$ has a valence of one or more, and thus one or more flexible chains $R^3$ can be introduced. Therefore, using this compound for optical materials can result in a cured body with excellent durability.

<Organic Residue $R^1$>

The structure of the organic residue $R^1$ will be described with specific examples. In exemplary structural formulas, the portion indicated by a wavy line is a bond to another structure. Specific examples of the organic residue $R^1$ include groups represented by the following formulas.

Specific examples of a monovalent organic residue include an alkyl group having 1 to 20 carbon atoms, a polyoxyethylene monomethyl ether group, and a propionic acid derivative group represented by Formula (2a) below.

[CF 3]

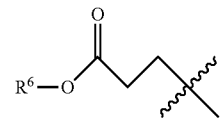
(2a)

In Formula (2a), $R^6$ is an alkyl group having 1 to 20 carbon atoms or a polyoxyethylene monomethyl ether group.

Specific examples of a divalent organic residue include an alkylene group having 1 to 20 carbon atoms, a polyoxyethylene glycol group, a divalent propionic acid derivative group represented by Formula (3a) below, and a polyoxyethylene-block-polyoxypropylene-block-polyoxyethylene glycol group represented by Formula (3b) below.

[CF 4]

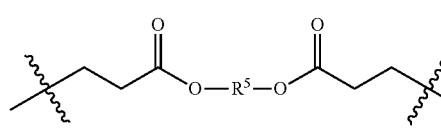
(3a)

In Formula (3a), $R^5$ is an alkylene group having 1 to 20 carbon atoms or a polyoxyethylene group.

[CF 5]

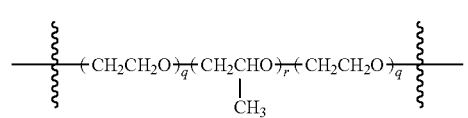
(3b)

In Formula (3b), "q" is 1 to 20, and "r" is 5 to 40.

Specific examples of a trivalent organic residue include a trimethylolpropane tripropionate derivative group represented by Formula (4c) below, a glycerol derivative group represented by Formula (4a) below, and a trimethylolpropane derivative group represented by Formula (4b) below.

[CF 6]

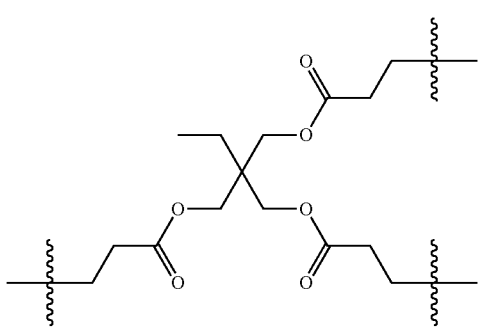
(4c)

[CF 7]

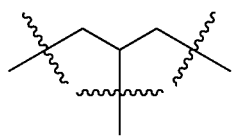
(4a)

[CF 8]

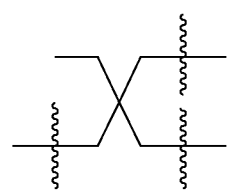
(4b)

Examples of a tetravalent organic residue include a dit-rimethylolpropane tetrapropionate derivative group, a pentaerythritol tetrapropionate derivative group represented by Formula (5d) below, a pentaerythritol group represented by Formula (5a) below, a diglycerol group derivative group represented by Formula (5b) below, and an erythritol derivative group represented by Formula (5c) below.

[CF 9]

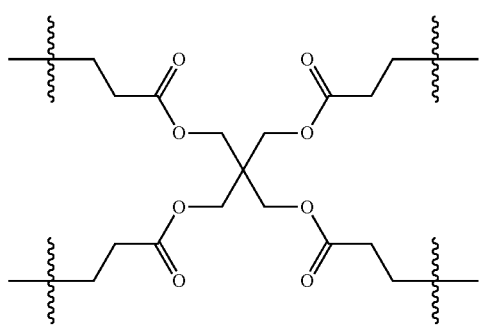
(5d)

[CF 10]

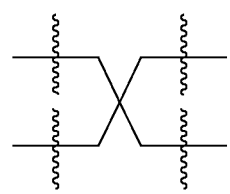
(5a)

[CF 11]

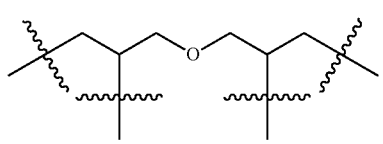
(5b)

[CF 12]

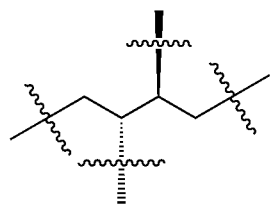
(5c)

Examples of a pentavalent organic residue include a D-glucopyranose group represented by Formula (6d) below.

[CF 13]

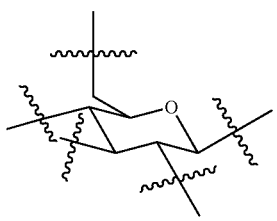
(6d)

Examples of a hexavalent organic residue include a dipentaerythritol hexapropionate derivative group represented by Formula (6h) below, a dipentaerythritol group represented by Formula (6a) below, a sorbitol group represented by Formula (6b) below, and a mannitol group represented by Formula (6c) below. Note that mannitol is a stereoisomer of sorbitol.

[CF 14]

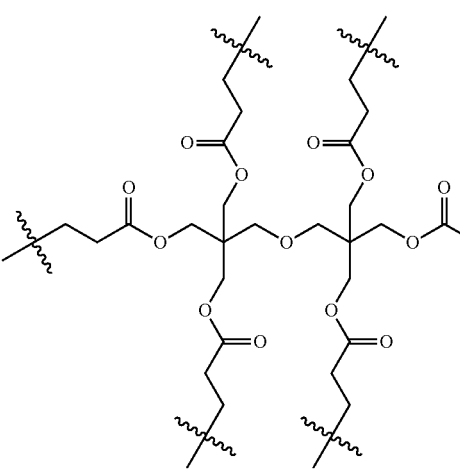
(6h)

-continued

[CF 15]

(6a)

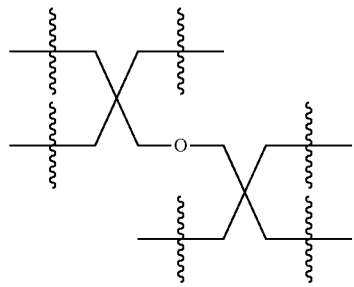

[CF 16]

(6b)

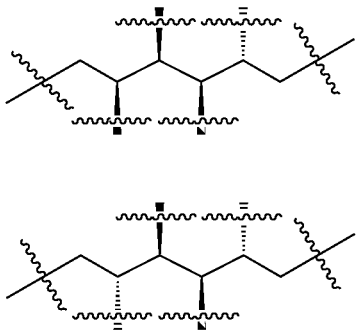

[CF 17]

(6c)

Examples of a 1- to 21-valent organic residue includes a β-cyclodextrin group represented by Formula (6e) below. When the β-cyclodextrin group has a valence of less than 21, randomly selected parts serve as bonds, and parts other than the bonds are modified by OH or $CH_3$, for example.

[CF 18]

(6e)

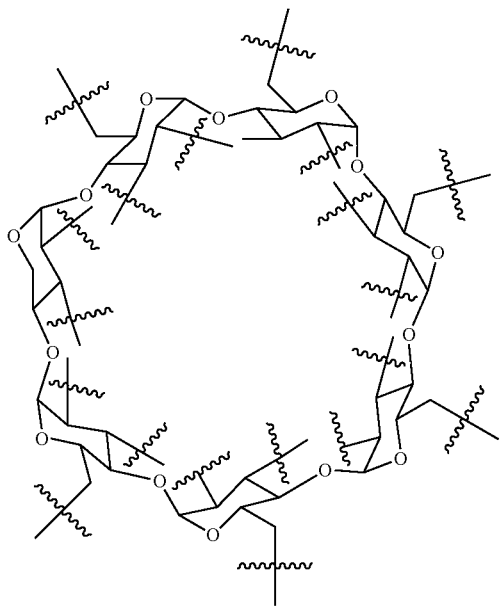

Examples of a 1- to 18-valent organic residue includes a α-cyclodextrin group represented by Formula (6f) below. When the α-cyclodextrin group has a valence of less than 18, randomly selected parts serve as bonds, and parts other than the bonds are modified by OH or CHs, for example.

[CF 19]

(6f)

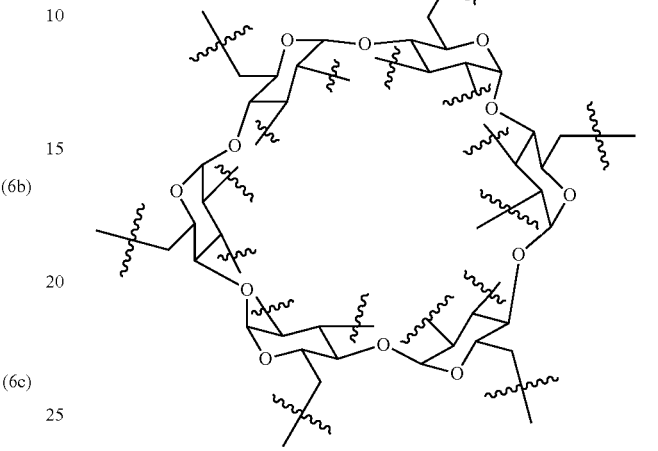

Examples of a 1- to 24-valent organic residue includes a γ-cyclodextrin group represented by Formula (6g) below. When the γ-cyclodextrin group has a valence of less than 24, randomly selected parts serve as bonds, and parts other than the bonds are modified by OH or $CH_3$, for example.

[CF 20]

(6g)

The organic residue $R^1$ is preferably an organic residue of a compound represented by Formula (IIIa), (IIIb), (IIIc) or (IIId) below. The organic residue represented by Formula (IIIa) is a monovalent to tetravalent pentaerythritol derivative group. The organic residue represented by Formula (IIIb) is a monovalent to tetravalent pentaerythritol propionate derivative group. The organic residue represented by Formula (IIIc) is a monovalent to hexavalent dipentaerythritol propionate derivative group. The organic residue represented by Formula (IIId) is a monovalent to hexavalent dipentaerythritol derivative group. Using the compound for optical materials containing this organic residue tends to result in a cured body with high durability and photochromic properties. From the viewpoint of excellent handling properties, the organic residue represented by Formula (IIIa) or (IIIb) is preferably used.

$$C(CH_2)_e(CH_2CH_3)_f \quad (IIIa)$$

In Formula (IIIa), "e" is 1 to 4; "f" is 0 to 3; and "e+f" is 4.

$$C(CH_2OC(=O)CH_2CH_2)_g(CH_2CH_3)_h \quad (IIIb)$$

In Formula (IIIb), "g" is 1 to 4; "h" is 0 to 3; and "g+h" is 4.

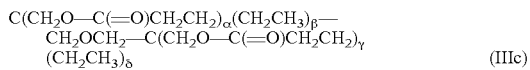
(IIIc)

In Formula (IIIc), "α" is 0 to 3; "β" is 0 to 3; "α+β" is 3; "γ" is 0 to 3; "δ" is 0 to 3; "γ+δ" is 3; and "α+γ" is 1 to 6.

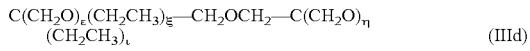
(IIId)

In Formula (IIId), "ε" is 0 to 3; "ξ" is 0 to 3; and "ε+ξ" is 3; "η" is 0 to 3; "ι" is 0 to 3; "η+ι" is 3; and "ε+η" is 1 to 6.

<Examples of Compound for Optical Materials>

The following are specific examples of the compound for optical materials according to the embodiment, Compounds (7a) to (25a).

[CF 21]

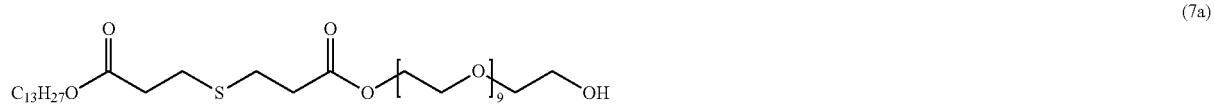
(7a)

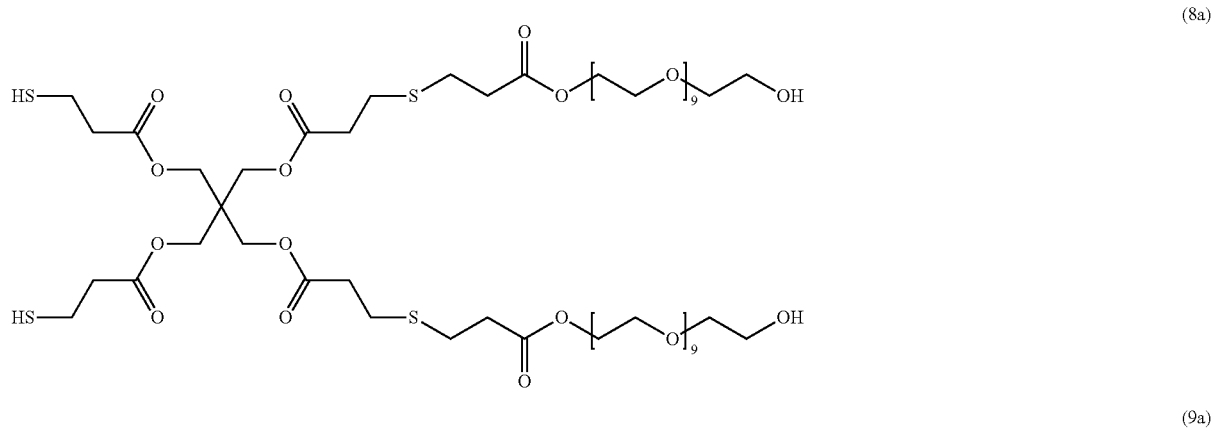
(8a)

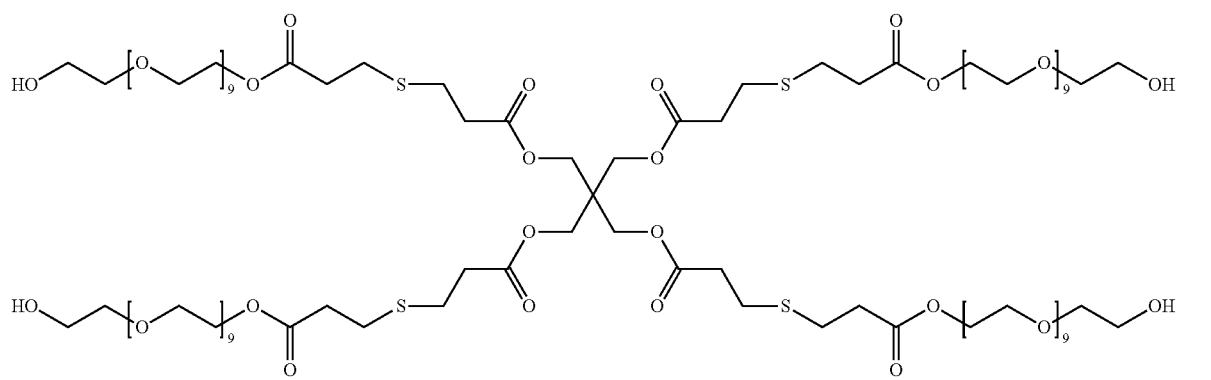
(9a)

[CF 22]

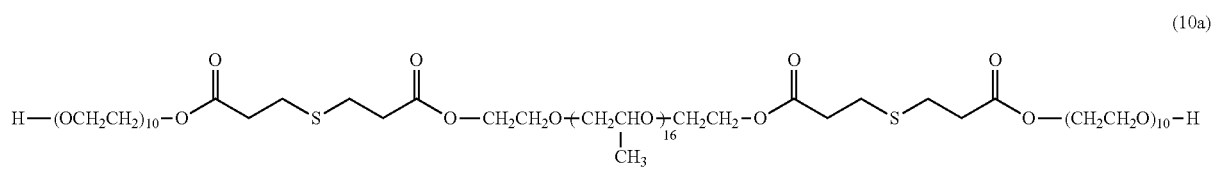
(10a)

-continued
[CF 23]
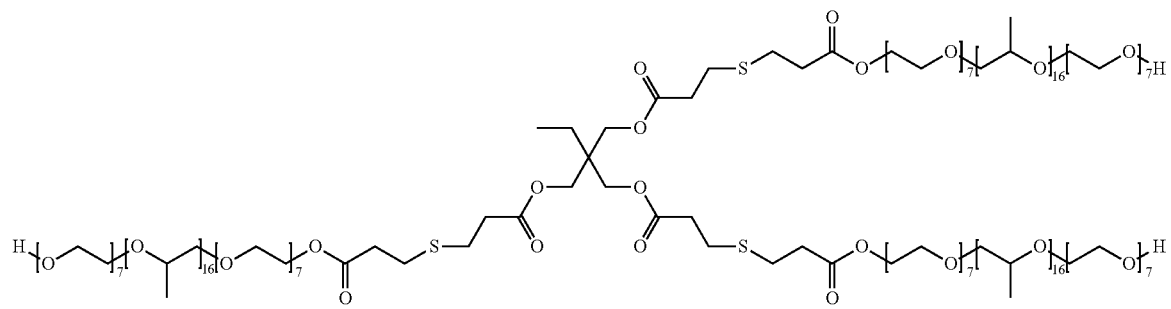
(11a)
[CF 24]
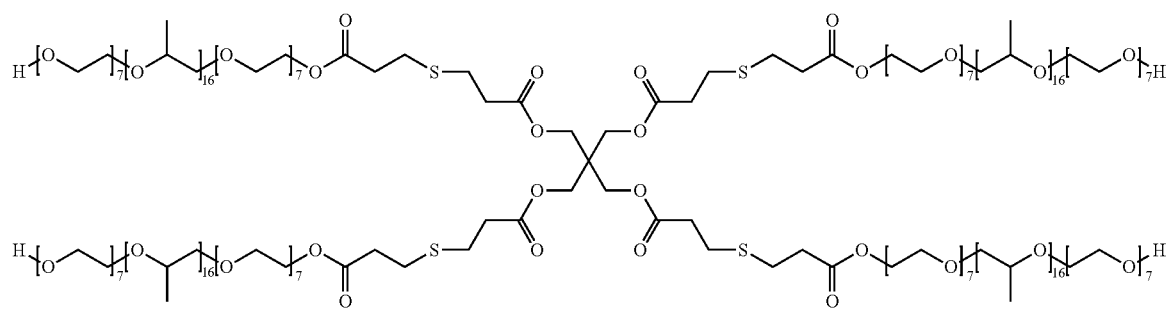
(12a)
[CF 25]
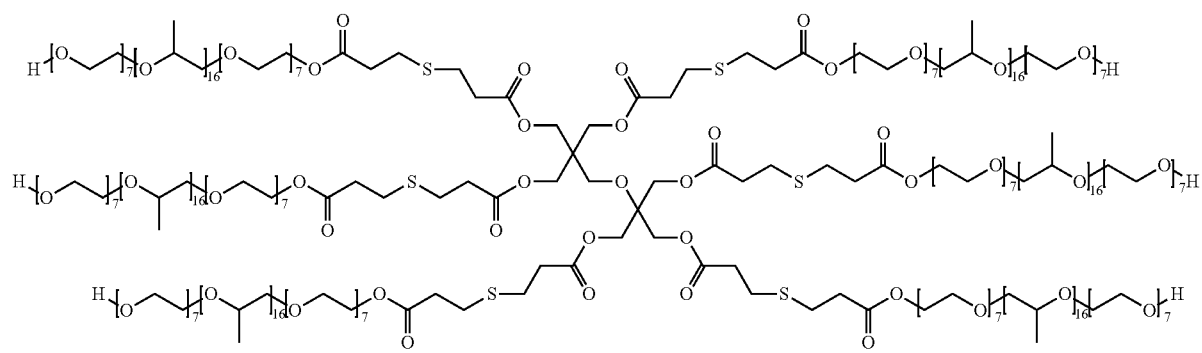
(13a)
[CF 26]
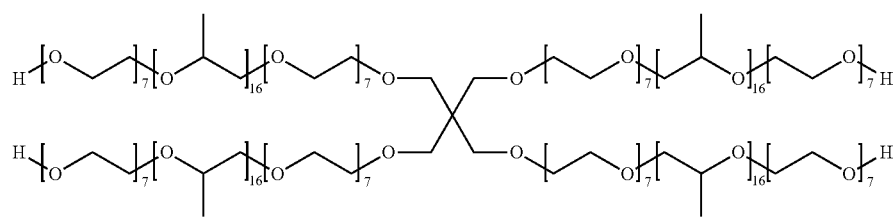
(14a)

[CF 27]
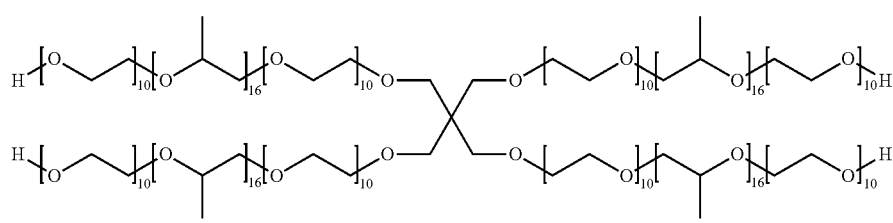
(15a)
[CF 28]
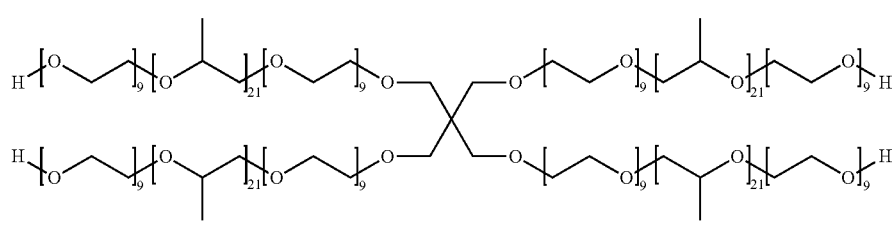
(16a)
[CF 29]
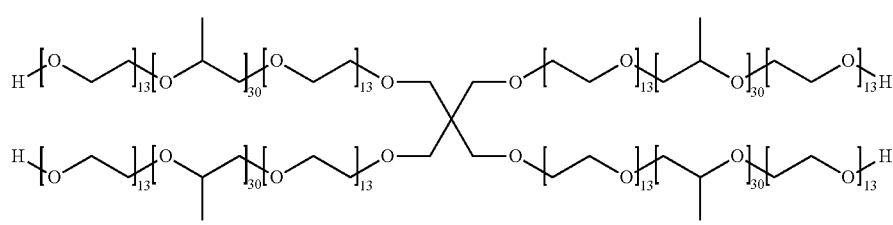
(17a)
[CF 30]
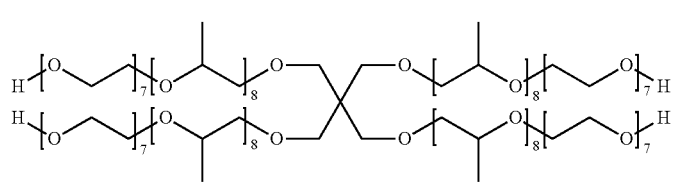
(18a)
[CF 31]
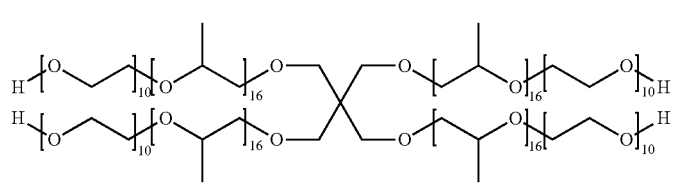
(19a)
[CF 32]
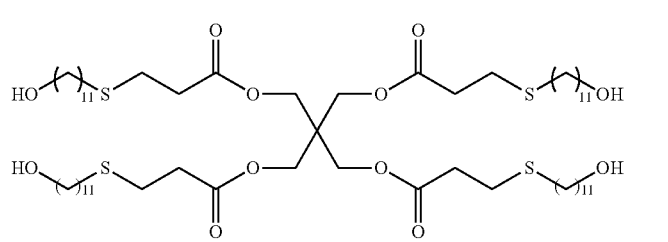
(20a)

-continued
[CF 33]
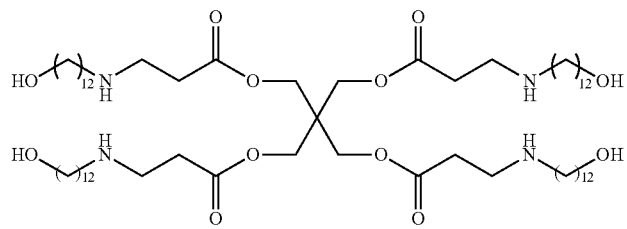
(21a)
[CF34]
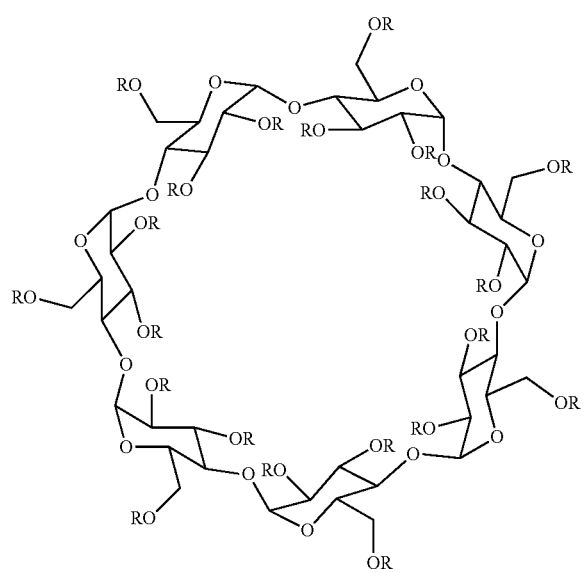
(22a)
In Formula (22a), 10 randomly selected R are each a molecular chain shown below.
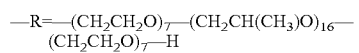
—R=—(CH$_2$CH$_2$O)$_7$—(CH$_2$CH(CH$_3$)O)$_{16}$—(CH$_2$CH$_2$O)$_7$—H
[CF 35]
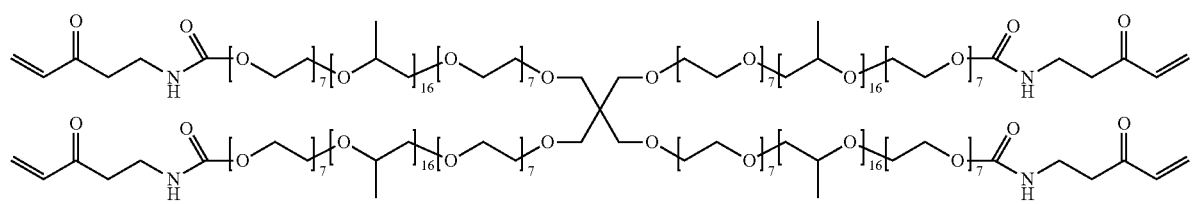
(23a)

The following are further specific examples of the compound for optical materials according to the embodiment, Compounds (24a) and (25a).

[CF 36]

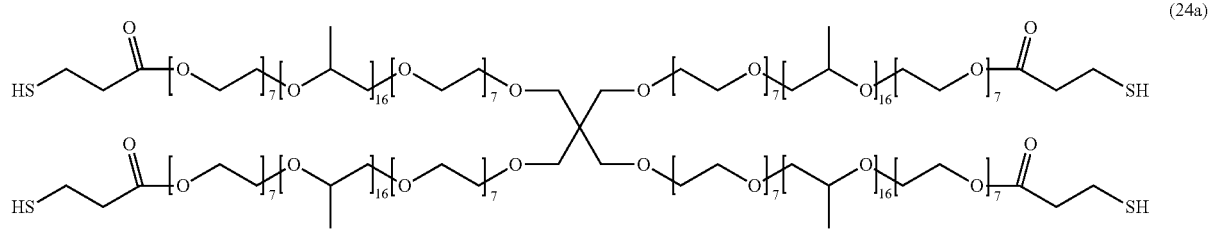

(24a)

[CF 37]

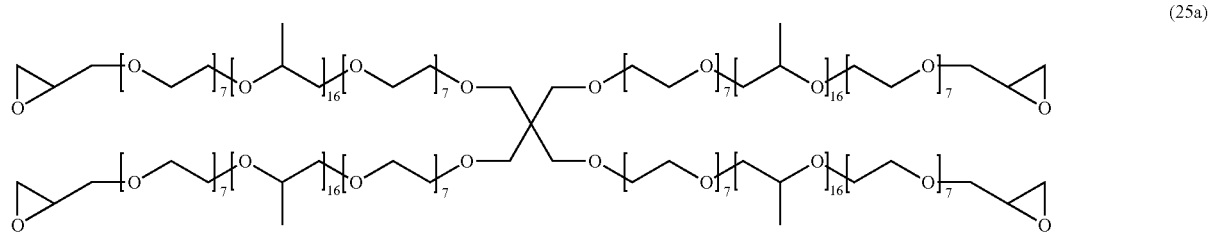

(25a)

[Method for Producing Compound for Optical Materials]

<Michael Addition Reaction>

The compound for optical materials is synthesized by a method which is not particularly limited. For example, the Michael addition reaction can be used to provide the compound for optical materials according to the embodiment. The Michael addition reaction is a reaction represented by Reaction formula 1 below, for example, and may be carried out under known reaction conditions (Non-Patent Document 1).

[CF 38]

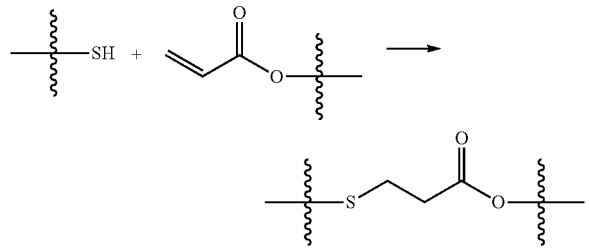

(Reaction formula 1)

More specifically, a compound with a structure of the organic residue $R^1$ that functions as a nucleophilic agent is mixed with a compound with a structure of the polymer group $R^3$ activated by nucleophilic attack, followed by stirring for a fixed time under a nitrogen atmosphere, thereby synthesizing the compound for optical materials according to the embodiment.

The compound with a structure of the organic residue $R^1$ that functions as a nucleophilic agent is, for example, a compound in which the bond of the organic residue $R^1$ is modified by OH, SH or $NH_2$.

Specific examples of the compound with a structure of the organic residue $R^1$ that functions as a nucleophilic agent include tridecyl(3-mercaptopropionate), trimethylolpropane tris(3-mercaptopropionate), pentaerythritol tetrakis(3-mercaptopropionate), and dipentaerythritol hexakis(3-mercaptopropionate).

Specific examples of the compound with a structure of the polymer group $R^3$ include polyethylene glycol monoacrylate, and polyethylene glycol polypropylene glycol polyethylene glycol.

The compound with a structure of the polymer group $R^3$ activated by nucleophilic attack is obtained, for example, by subjecting the compound with a structure of the polymer group $R^3$ to an acrylate treatment.

<Nucleophilic Substitution Reaction>

The compound for optical materials according to the embodiment can also be synthesized by, for example, a nucleophilic substitution reaction. The nucleophilic substitution reaction is a reaction represented by Reaction formula 2 below, for example, and may be carried out under known reaction conditions.

[CF 39]

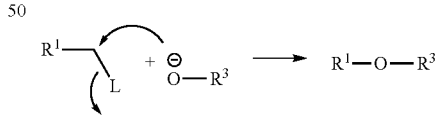

(Reaction formula 2)

More specifically, a compound with a structure of the polymer group $R^3$ that functions as a nucleophilic agent is anionized with a base, and mixed with the organic residue $R^1$ with a leaving group L activated by nucleophilic attack, followed by stirring for a fixed time under a nitrogen atmosphere, thereby synthesizing the compound for optical materials according to the embodiment.

Specific examples of the compound with a structure of the polymer group $R^3$ that functions as a nucleophilic agent include polyethylene glycol polypropylene glycol polyethylene glycol, and polyethylene glycol polytetramethylene glycol polyethylene glycol.

Examples of the base for use in the nucleophilic substitution reaction include metallic hydroxide, sodium hydride, and potassium tert-butoxide.

In Reaction formula 2, L is a leaving group, which is not particularly limited as long as it forms an ether bond as a result of the nucleophilic substitution reaction. Examples include a chlorine atom, a bromine atom, an iodine atom, a p-toluenesulfonyloxy group, a methanesulfonyloxy group, and a trifluoromethanesulfonyloxy group.

Specific examples of the organic residue $R^1$ with the leaving group L activated by nucleophilic attack include pentaerythrityl tetrabromide.

The nucleophilic substitution reaction can be carried out in a solvent. The solvent is not particularly limited as long as it does not interfere with the nucleophilic substitution reaction. Examples include aprotic polar solvents such as tetrahydrofuran, acetonitrile, and dimethylformamide.

[Curable Composition]

The compound for optical materials (Component D) represented by Formula (Ia) can be used as a constituent of a curable composition.

When the curable composition is cured, a cured body is obtained. The curable composition can contain, in addition to the compound for optical materials (Component D) represented by Formula (Ia), a polyisocyanate compound and a polyisothiocyanate compound (Component B). In addition, the curable composition may contain at least one selected from the group consisting of an active hydrogen-containing compound (Component C), a photochromic compound (Component A), a curing accelerator (Component E), and other additives.

<Urethane-Based Curable Composition>

The compound for optical materials (Component D) can be used as a component of a urethane-based curable composition. The urethane-based curable composition includes, in addition to the compound for optical materials (Component D), at least one of a polyisocyanate compound and a polyisothiocyanate compound, i.e., the polyiso(thio)cyanate compound (Component B). It is preferable that the active hydrogen-containing compound (Component C) is added just before the urethane-based curable composition is cured.

The content of the compound for optical materials (Component D) in the urethane-based curable composition is preferably not less than 1% by mass, more preferably not less than 3% by mass, and still more preferably not less than 8% by mass. When the compound for optical materials (Component D) is contained in a larger amount, the photochromic properties of a cured body tends to increase. Meanwhile, from the viewpoint of enhancing the durability of the cured body, the content of the compound for optical materials (Component D) is preferably not more than 50% by mass, more preferably not more than 30% by mass, and still more preferably not more than 20% by mass.

The blending amount of the compound for optical materials (Component D) with respect to 100 parts by mass of the total of the polyiso(thio)cyanate compound (Component B) and the active hydrogen-containing compound (Component C) is preferably not less than 1 part by mass and not more than 50 parts by mass, more preferably not less than 5 parts by mass and not more than 35 parts by mass, and still more preferably not less than 10 parts by mass and not more than 25 parts by mass.

<Polyiso(thio)cyanate Compound (Component B)>

The "polyiso(thio)cyanate compound (Component B)" is a compound having two or more isocyanate groups, a compound having two or more isothiocyanate groups, or a compound having one or more isocyanate group and one or more isothiocyanate group.

Examples of the polyisocyanate compound (Component B) include an aliphatic isocyanate compound, an alicyclic isocyanate compound, an aromatic isocyanate compound, a sulfur-containing heterocyclic isocyanate compound, a sulfur-containing aliphatic isocyanate compound, an aliphatic sulfide-based isocyanate compound, an aromatic sulfide-based isocyanate compound, an aliphatic sulfone-based isocyanate compound, an aromatic sulfone-based isocyanate compound, a sulfonic ester-based isocyanate compound, and an aromatic sulfonic acid amide-based isocyanate compound.

Further examples of the polyisocyanate compound (Component B) include blocked isocyanate compounds obtained by blocking the isocyanate group of the aforementioned polyisocyanate compounds with at least one blocking agent selected from the group consisting of alcohols, lactams, phenols, oximes, pyrazoles, thiols, an active methylene compound, a malonic acid diester-based compound, and an acetoacetic ester-based compound.

The amount of the polyiso(thio)cyanate compound (Component B) in the urethane-based curable composition is preferably not less than 10 parts by mass and not more than 200 parts by mass, more preferably not less than 50 parts by mass and not more than 150 parts by mass, with respect to 100 parts by mass of the active hydrogen-containing compound (Component C).

Above all, suitable examples of the polyisocyanate compound (Component B) for producing an optical article with excellent transparency and mechanical strength, in particular, an optical article containing the photochromic compound (Component A), include compounds represented by Formulas (I) to (VIII) below.

Preferred examples of the aliphatic isocyanate compound include compounds represented by the following formula.

[CF 40]

$$OCN-R^{100}-NCO \quad (I)$$

(In the formula, $R^{100}$ is an alkylene group having 1 to 10 carbon atoms, in which a methylene group in the chain of the alkylene group above may be partially substituted with a sulfur atom.)

$R^{100}$, which is an alkylene group having 1 to 10 carbon atoms, may be a linear or branched group. Above all, $R^{100}$ is preferably a linear pentamethylene group, hexamethylene group, heptamethylene group, or octamethylene group; or a branched pentamethylene group, hexamethylene group, heptamethylene group, or octamethylene group in which a hydrogen atom is partially substituted with a methyl group. The alkylene group in which a methylene group is partially substituted with a sulfur atom is preferably a —$CH_2CH_2SCH_2CH_2SCH_2CH_2$— group.

Specific examples of the compound represented by Formula (I) include pentamethylene diisocyanate, hexamethylene diisocyanate, heptamethylene diisocyanate, octamethylene diisocyanate, 2,4,4,-trimethyl hexamethylene diisocyanate, and 1,2-bis(2-isocyanatoethylthio)ethane. Any of these compounds can be used alone or in combination with one or more of the other compounds.

Preferred examples of the alicyclic isocyanate compound and the aromatic isocyanate compound include compounds represented by Formulas (II) and (III) below.

[CF 41]

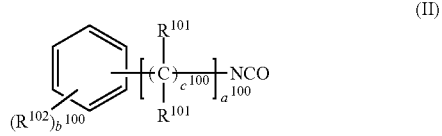

(II)

[CF 42]

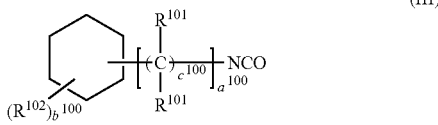

(III)

(In the formulas,
$R^{101}$ are each an alkyl group having 1 to 4 carbon atoms, or a hydrogen atom, and may be the same or different groups;
$R^{102}$ is an alkyl group having 1 to 4 carbon atoms, and when a plurality of the groups are present, they may be the same or different groups;
$a^{100}$ is an integer of 2 or 3; $b^{100}$ is an integer of 0 to 4; and $c^{100}$ is an integer of 0 to 4.) The difference between the compound represented by Formula (II) and the compound represented by Formula (III) is the presence of a phenyl group (compound represented by Formula (II))/a cyclohexane group (compound represented by Formula (III)).

The alkyl group having 1 to 4 carbon atoms as $R^{101}$ may be a linear or branched group. Above all, $R^{101}$ is particularly preferably a hydrogen atom, a methyl group, or an ethyl group. Also, the alkyl group having 1 to 4 carbon atoms as $R^{102}$ may be a linear or branched group. Above all, $R^{102}$ is particularly preferably a methyl group or an ethyl group.

Specific examples of the compound represented by Formula (II) or (III) include isophorone diisocyanate, xylene diisocyanate (o-, m-, p-), 2,4-tolylenediisocyanate, 2,6-tolylenediisocyanate, 1,3-bis(isocyanatomethyl)cyclohexane, and 1,4-bis(isocyanatomethyl)cyclohexane. Any of these compounds can be used alone or in combination with one or more of the other compounds.

Further preferred examples of the alicyclic isocyanate compound and the aromatic isocyanate compound include compounds represented by Formulas (IV) and (V) below.

[CF 43]

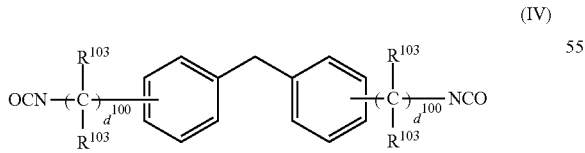

(IV)

[CF 44]

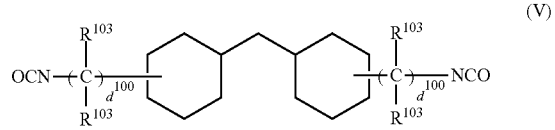

(V)

(In the formulas, $R^{103}$ are each an alkyl group having 1 to 4 carbon atoms, or a hydrogen atom, and may be the same or different groups, and $d^{100}$ is an integer of 0 to 4.) The difference between the compound represented by Formula (IV) and the compound represented by Formula (V) is the presence of two phenyl groups (compound represented by Formula (IV))/two cyclohexane groups (compound represented by Formula (V)).

The alkyl group having 1 to 4 carbon atoms as $R^{103}$ may be a linear or branched group. Above all, $R^{103}$ is particularly preferably a hydrogen atom, a methyl group, or an ethyl group.

Specific examples of the compound represented by Formula (IV) or (V) include 4,4'-diphenylmethane diisocyanate, and dicyclohexylmethane-4,4'-diisocyanate. Any of these compounds can be used alone or in combination with one or more of the other compounds.

Still further preferred examples of the alicyclic isocyanate compound include compounds represented by Formula (VI) below.

[CF 45]

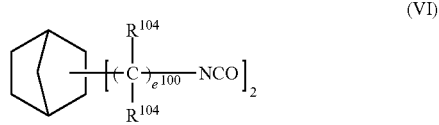

(VI)

(In the formula, $R^{104}$ are each an alkyl group having 1 to 4 carbon atoms, or a hydrogen atom, and may be the same or different groups, and $e^{100}$ is an integer of 0 to 4.)

The alkyl group having 1 to 4 carbon atoms as $R^{104}$ may be a linear or branched group. Above all, $R^{104}$ is particularly preferably a hydrogen atom, a methyl group, or an ethyl group.

Specific examples of the compound represented by Formula (VI) include norbornane diisocyanate, 2,5-bis(isocyanatemethyl)-bicyclo[2,2,1]-heptane, and 2,6-bis(isocyanatemethyl)-bicyclo[2,2,1]-heptane.

Any of these compounds can be used alone or in combination with one or more of the other compounds.

(Sulfur-Containing Heterocyclic Isocyanate Compound)

Preferred examples of the sulfur-containing heterocyclic isocyanate compound include compounds represented by Formulas (VII) and (VIII).

[CF 46]

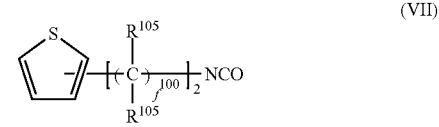

(VII)

[CF 47]

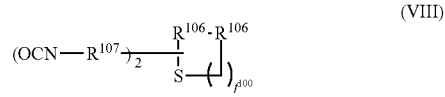

(VIII)

(In the formulas,
$R^{105}$ are each an alkyl group having 1 to 4 carbon atoms, or a hydrogen atom, and may be the same or different groups;

$R^{106}$ is a methylene group or a sulfur atom; $R^{107}$ is an alkylene group having 1 to 6 carbon atoms or an alkylene group having 1 to 6 carbon atoms in which a methylene group in the chain is partially substituted with a sulfur atom; and $f^{100}$ is an integer of 0 to 2.)

Specific examples of the compound represented by Formula (VII) or (VIII) include 2,5-bis(isocyanatomethyl)thiophene, 2,5-bis(isocyanatomethyl)-1,4-dithiane, 3,4-bis(isocyanatomethyl)tetrahydrothiophene, and 4,5-bis(isocyanatomethyl)-1,3-dithiolane. Any of these compounds can be used alone or in combination with one or more of the other compounds.

In addition to the aforementioned polyisocyanates, their halogen substitutes, alkyl substitutes, alkoxy substitutes, nitro substitutes, prepolymer-type modified products with polyhydric alcohol, carbodiimide-modified products, urea-modified products, biuret-modified products, dimerized or trimerized products, and the like are also available.

The polyisothiocyanate compound can be a compound obtained by replacing the isocyanate group of the polyisocyanate compound represented by any of Formulas (I) to (VIII) by an isothiocyanate group. Specific examples include an aliphatic isothiocyanate compound, an alicyclic isothiocyanate compound, an aromatic isothiocyanate compound, a sulfur-containing heterocyclic isothiocyanate compound, a heterocyclic ring-containing isothiocyanate compound, a sulfur-containing aliphatic isothiocyanate compound, and a sulfur-containing aromatic isothiocyanate compound.

More specifically, preferred examples of the aliphatic isothiocyanate compound include hexamethylene diisothiocyanate, 1,2-diisothiocyanate ethane, 1,3-diisothiocyanate propane, 1,4-diisothiocyanate butane, 1,6-diisothiocyanate hexane, 2,4,4,-trimethylhexanemethylene diisothiocyanate, thiobis(3-isothiocyanate propane), thiobis(2-isothiocyanate ethane), and dithiobis(2-isothiocyanate ethane).

Preferred examples of the alicyclic isothiocyanate compound and the aromatic isothiocyanate compound include p-phenylenediisopropylidene diisothiocyanate, 1,2-diisothiocyanate benzene, 1,3-diisothiocyanate benzene, 1,4-diisothiocyanate benzene, 2,4-diisothiocyanate toluene, isophorone diisothiocyanate, xylene diisothiocyanate (o-, m-, p-), 2,4-tolylene diisothiocyanate, 2,6-tolylene diisothiocyanate, and cyclohexane diisothiocyanate. Other examples include 1,1'-methylenebis(4-isothiocyanate benzene), 1,1'-methylenebis(4-isothiocyanate 2-methylbenzene), and 1,1'-methylenebis(4-isothiocyanate 3-methylbenzene).

Preferred examples of the alicyclic isothiocyanate compound include 2,4-bis(isothiocyanatomethyl) norbornane, 2,5-bis(isothiocyanatomethyl) norbornane, 2,6-bis(isothiocyanatomethyl) norbornane, 3,5-bis(isothiocyanatomethyl) norbornane, and norbornane diisocyanate.

Preferred examples of the sulfur-containing heterocyclic isothiocyanate compound include thiophene-2,5-diisothiocyanate, 1,4-dithiane-2,5-diisothiocyanate, 2,5-bis(isothiocyanatomethyl)-1,4-dithiane, and 4,5-bis(isothiocyanatomethyl)-1,3-dithiolane.

Examples of the compound having both an isocyanate group and an isothiocyanate group include a compound obtained by replacing at least one isocyanate group of any of the above-specified polyisocyanate compounds by an isothiocyanate group, and a compound obtained by replacing at least one isothiocyanate group of any of the above-specified polyisothiocyanate compounds by an isocyanate group.

The compound having an iso(thio)cyanate group blocked with a blocking agent (hereinafter, also referred to as a blocked iso(thio)cyanate compound) can be obtained by reacting the iso(thio)cyanate group of the polyiso(thio)cyanate compound with at least one blocking agent selected from the group consisting of alcohols, lactams, phenols, oximes, pyrazoles, thiols, an active methylene compound, a malonic acid diester-based compound, and an acetoacetic ester-based compound. The conditions of reacting the iso(thio)cyanate group with the blocking agent vary according to the type of the blocking agent and, thus, may be determined as appropriate depending on the blocking agent to be selected. The protection of the iso(thio)cyanate group by the blocking agent can be confirmed by Fourier transform infrared spectroscopy (FT-IR).

Using the blocked iso(thio)cyanate compound makes it possible to extend the working time of the urethane-based curable composition.

Preferred examples of the isocyanate compound include pentamethylene diisocyanate, hexamethylene diisocyanate, heptamethylene diisocyanate, octamethylene diisocyanate, 1,3-bis(isocyanatomethyl)cyclohexane, 1,4-bis(isocyanatomethyl)cyclohexane, isophorone diisocyanate, norbornane diisocyanate, 2,5-bis(isocyanatomethyl)-bicyclo[2,2,1]-heptane, 2,6-bis(isocyanatomethyl)-bicyclo[2,2,1]-heptane, 1,2-bis(2-isocyanatoethylthio)ethane, xylene diisocyanate (o-, m-, p-), 2,4-tolylene diisocyanate, 2,6-tolylene diisocyanate, and 4,4'-diphenylmethane diisocyanate. Any of these compounds can be used alone or in combination with the other compounds.

<Active Hydrogen-Containing Compound (Component C)>

Examples of the active hydrogen-containing compound (Component C) include an aliphatic poly(thi)ol compound and an aromatic poly(thi)ol compound. The aliphatic poly(thi)ol compound includes an aliphatic polyol compound and an aliphatic polythiol compound. The aromatic poly(thi)ol compound includes an aromatic polyol compound and an aromatic polythiol compound.

The amount of the active hydrogen-containing compound (Component C) in the urethane-based curable composition is preferably not less than 10 parts by mass and not more than 200 parts by mass, more preferably not less than 80 parts by mass and not more than 150 parts by mass, with respect to 100 parts by mass of the polyiso(thio)cyanate compound (Component B).

Above all, suitable examples of the poly(thi)ol compound for producing an optical article with excellent transparency and heat resistance, in particular, an optical article containing the photochromic compound (Component A), include compounds represented by Formulas (IX) to (XVII) below.

(Aliphatic Poly(thi)ol Compound)

Preferred examples of the aliphatic poly(thi)ol compound include compounds represented by Formula (IX) below.

[CF 48]

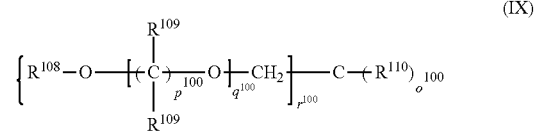

(IX)

{In the formula, $R^{108}$ is a hydrogen atom, or a group synonymous with that of Formula (X) below, and may be the same or different;

[CF 49]

(X)

(In the formula, $R^{111}$ is an alkylene group having 1 to 6 carbon atoms,)

$R^{109}$ are each a hydrogen atom, a methyl group, or an ethyl group, and may be the same or different;

$R^{110}$ is a hydrogen atom, or an alkyl group having 1 to 6 carbon atoms, and when a plurality of $R^{110}$ are present, they may be the same or different;

$o^{100}$ is 0 to 2; $p^{100}$ is 1 to 6; $q^{100}$ is 0 to 10; $r^{100}$ is 2 to 4; and $o^{100}+r^{100}$ is 4.}

$R^{111}$, which is an alkylene group having 1 to 6 carbon atoms, may be a linear or branched group. Above all, $R^{111}$ is particularly preferably a methylene group, an ethylene group, a trimethylene group, or a propylene group.

Specific examples of the compound represented by Formula (IX) include trimethylolpropane, pentaerythritol, trimethylolpropane tris(3-mercaptopropionate), and pentaerythritol tetrakis(3-mercaptopropionate).

Preferred examples of the aliphatic poly(thi)ol compound also include polyfunctional poly(thi)ol compounds having an ether bond represented by Formula (XI) below.

[CF 50]

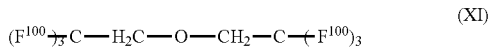

(XI)

{In the formula,
$F^{100}$ are each an alkyl group having 1 to 6 carbon atoms, or a compound represented by Formula (XII) below;

[CF 51]

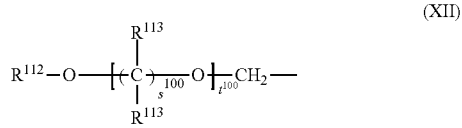

(XII)

(In the formula,
$R^{112}$ is a hydrogen atom, or a group synonymous with that of Formula (X), and may be the same or different groups;
$R^{113}$ are each a hydrogen atom, a methyl group, or an ethyl group, and may be the same or different groups;
$s^{100}$ is 1 to 6; and $t^{100}$ is 0 to 10.)}

At least two $F^{100}$ are the groups represented by Formula (XII). The other $F^{100}$ are alkyl groups having 1 to 6 carbon atoms and may be linear or branched groups. Above all, $F^{100}$ is particularly preferably a methyl group, an ethyl group, a trimethyl group, or a propyl group. As long as two or more $F^{100}$ are the groups represented by Formula (XII), $F^{100}$ may be the same or different groups. Specific examples of the compound represented by Formula (XI) include ditrimethylolpropane, dipentaerythritol, ditrimethylolpropane tetrakis(3-mercaptopropionate), and dipentaerythritol hexakis(3-mercaptopropionate).

Preferred examples of the aliphatic poly(thi)ol compound also include polyfunctional polythiol compounds represented by Formula (XIII) below.

[CF 52]

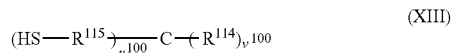

(XIII)

(In the formula,
$R^{114}$ is a hydrogen atom, an alkyl group having 1 to 6 carbon atoms, or an alkyl group having 1 to 6 carbon atoms in which a methylene group is partially substituted with a sulfur atom, and when a plurality of $R^{114}$ are present, they may be the same or different groups;
$R^{115}$ is an alkylene group having 1 to 10 carbon atoms, an alkylene group having 1 to 10 carbon atoms in which a methylene group in the chain is partially substituted with a sulfur atom, or an alkylene group having 1 to 10 carbon atoms in which a hydrogen atom is partially substituted with a thiol group, and when a plurality of $R^{115}$ are present, they may be the same or different groups;
$u^{100}$ is an integer of 2 to 4; $v^{100}$ is an integer of 0 to 2; and $u^{100}+v^{100}$ is 4.)

The alkyl group having 1 to 6 carbon atoms as $R^{114}$ may be a linear or branched group. Above all, $R^{114}$ is preferably a hydrogen atom, a methyl group, or an ethyl group. Specific examples of the alkyl group having 1 to 6 carbon atoms in which a methylene group in the chain is partially substituted with a sulfur atom include —CH$_2$SCH$_3$.

The alkylene group having 1 to 10 carbon atoms as $R^{115}$ may be a linear or branched group. Above all, $R^{115}$ is preferably a methylene group, an ethylene group, a trimethylene group, or a propylene group. Specific examples of the alkylene group having 1 to 10 carbon atoms in which a methylene group in the chain is partially substituted with a sulfur atom include —CH$_2$S—, —CH$_2$CH$_2$S—, and —CH$_2$CH$_2$CH$_2$S—. Further, examples of the alkyl group having 1 to 6 carbon atoms in which a hydrogen atom is partially substituted with a thiol group include —CH$_2$SCH(SCH$_2$SH)—.

Specific examples of the compound represented by Formula (XIII) include
4-mercaptomethyl-1,8-dimercapto-3,6-dithiaoctane,
1,1,1,1-tetrakis(mercaptomethyl)methane,
1,1,3,3-tetrakis(mercaptomethylthio)propane,
1,1,2,2-tetrakis(mercaptomethylthio)ethane,
4,7-bismercaptomethyl-3,6,9-trithio-1,11-undecanedithiol,
5,7-dimercaptomethyl-1,11-dimercapto-3,6,9-trithiaundecane, and
4,8-dimercaptomethyl-1,11-dimercapto-3,6,9-trithiaundecane.

Preferred examples of the aromatic poly(thi)ol compound include phenyl group-containing polythiol compounds represented by Formula (XIV) below.

[CF 53]

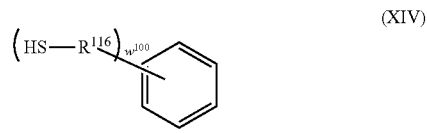

(XIV)

(In the formula,

R$^{116}$ is an alkylene group having 1 to 6 carbon atoms, or an alkylene group having 1 to 6 carbon atoms in which a methylene group in the chain is partially substituted with a sulfur atom, and w$^{100}$ is 3.)

The alkylene group having 1 to 6 carbon atoms as R$^{116}$ may be a linear or branched group. Above all, R$^{116}$ is preferably a methylene group, an ethylene group, a trimethylene group, or a propylene group. Specific examples of the alkylene group having 1 to 6 carbon atoms in which a methylene group in the chain is partially substituted with a sulfur atom include —CH$_2$CH$_2$CH$_2$SCH$_2$—, —CH$_2$CH$_2$SCH$_2$—, and —CH$_2$SCH$_2$—. Specific examples of the compound represented by Formula (XIV) include 1,3,5-tris(mercaptopropylthiomethyl)benzene.

Other preferred examples of the poly(thi)ol compound include poly(thi)ol compounds having a triazine ring represented by Formula (XV) below.

[CF 54]

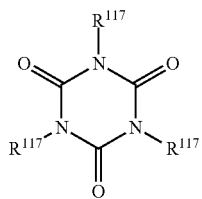

(XV)

{In the formula,

R$^{117}$ are each an alkyl group having 1 to 6 carbon atoms, or a group represented by Formula (XVI) below,

[CF 55]

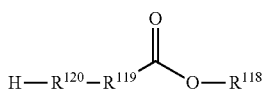

(XVI)

(In the formula,

R$^{118}$ and R$^{119}$ are each an alkylene group having 1 to 6 carbon atoms, and R$^{120}$ is an oxygen atom or a sulfur atom,) and at least two R$^{117}$ are the groups represented by Formula (XVI) and R$^{117}$ may be the same or different groups.}

R$^{118}$ and R$^{119}$, which are each an alkylene group having 1 to 6 carbon atoms, may be a linear or branched group. Above all, R$^{118}$ and R$^{119}$ are each preferably a methylene group, an ethylene group, a trimethylene group, or a propylene group. Specific examples of the compound represented by Formula (XV) include 2-mercaptomethanol, and tris-{(3-mercaptopropionyloxy)-ethyl}-isocyanurate.

Other preferred examples of the poly(thi)ol compound include compounds having a silsesquioxane structure. The compound having a silsesquioxane structure has various molecular structures such as cage-like, ladder-like, and random structures; this compound is represented by Formula (XVII) below.

[CF 56]

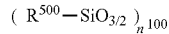

(XVII)

(In the formula, a plurality of R$^{500}$ may be the same or different from each other, and are each a hydrogen atom, an alkyl group, a cycloalkyl group, an alkoxy group, a phenyl group, and/or an organic group containing at least two or more hydroxyl groups and/or thiol groups in one molecule, and n$^{100}$ is an integer of 3 to 100.)

The poly(thi)ol compound can be used without any particular limitation, and a plurality of the poly(thi)ol compounds can be used in combination in consideration of the photochromic properties and mechanical properties of a cured body to be obtained. In particular, the poly(thi)ol compound preferably has three to six active hydrogen-containing groups in one molecule so as to impart the curable composition with excellent formability and handleability and to produce a photochromic optical article with excellent properties.

The poly(thi)ol compound is preferably trimethylolpropane tris(3-mercaptopropionate), pentaerythritol tetrakis(3-mercaptopropionate), dipentaerythritol hexakis(3-mercaptopropionate), 4-mercaptomethyl-1,8-dimercapto-3,6-dithiaoctane, or tris-{(3-mercaptopropionyloxy)-ethyl}-isocyanurate. Among them, the poly(thi)ol compound is more preferably at least one of trimethylolpropane tris(3-mercaptopropionate), pentaerythritol tetrakis(3-mercaptopropionate), and dipentaerythritol hexakis(3-mercaptopropionate).

In particular, dipentaerythritol hexakis(3-mercaptopropionate) is most preferable because it can increase the photochromic properties and mechanical properties of a cured body to be obtained. From the viewpoint of photochromic properties, it is preferable to use dipentaerythritol hexakis (3-mercaptopropionate) alone as the poly(thi)ol compound. However, when a cured body is obtained by cast polymerization, dipentaerythritol hexakis(3-mercaptopropionate) which has a high viscosity can be used in combination with another poly(thi)ol compound for the purpose of viscosity control. The other poly(thi)ol compound is preferably trimethylolpropane tris(3-mercaptopropionate), pentaerythritol tetrakis(3-mercaptopropionate), 1,6-hexanediol bis(3-mercaptopropionate), 1,2-bis[(2-mercaptoethyl)thio]-3-mercaptopropane, 2,2-bis(mercaptomethyl)-1,4-butanedithiol, 2,5-bis(mercaptomethyl)-1,4-dithiane, 4-mercaptomethyl-1,8-dimercapto-3,6-dithiaoctane, 1,1,1,1-tetrakis(mercaptomethyl)methane, 1,1,3,3-tetrakis(mercaptomethylthio)propane, 1,1,2,2-tetrakis(mercaptomethylthio)ethane, 4,6-bis(mercaptomethylthio)-1,3-dithiane, or tris-{(3-mercaptopropionyloxy)-ethyl}-isocyanurate. In particular, trimethylolpropane tris(3-mercaptopropionate) is preferably used in combination, because it can improve handling properties while maintaining excellent photochromic properties.

<Photochromic Compound (Component A)>

The photochromic compound (Component A) can be used without any particular limitation as long as it exhibits photochromic properties. The photochromic compound (Component A) can be used alone or in combination with one or more other photochromic compounds.

Typical examples of the photochromic compound (Component A) include known photochromic compounds such as a chromene compound, a fulgimide compound, a spirooxazine compound, and a spiropyran compound. Any of these photochromic compounds can be used without any limitation.

Examples of the fulgimide compound, the spirooxazine compound, the spiropyran compound, and the chromene compound include those described in, for example, JP-A-2-28154, JP-A-62-288830, the pamphlet of WO 94/22850, the pamphlet of WO 96/14596, and the like.

Besides the chromene compounds described in the aforementioned patent documents, a chromene compound with excellent photochromic properties is also known, which can be suitably used as Component A. Such a chromene compound is disclosed in JP-A-2001-031670, JP-A-2001-011067, JP-A-2001-011066, JP-A-2000-344761, JP-A-2000-327675, JP-A-2000-256347, JP-A-2000-229976, JP-A-2000-229975, JP-A-2000-229974, JP-A-2000-229973, JP-A-2000-229972, JP-A-2000-219678, JP-A-2000-219686, JP-A-11-322739, JP-A-11-286484, JP-A-11-279171, JP-A-09-218301, JP-A-09-124645, JP-A-08-295690, JP-A-08-176139, JP-A-08-157467, U.S. Pat. Nos. 5,645,767, 5,658,501, 5,961,892, 6,296,785, Japanese Patent No. 4424981, Japanese Patent No. 4424962, the pamphlet of WO 2009/136668, the pamphlet of WO 2008/023828, Japanese Patent No. 4369754, Japanese Patent No. 4301621, Japanese Patent No. 4256985, the pamphlet of WO 2007/086532, JP-A-2009-120536, JP-A-2009-67754, JP-A-2009-67680, JP-A-2009-57300, Japanese Patent No. 4195615, Japanese Patent No. 4158881, Japanese Patent No. 4157245, Japanese Patent No. 4157239, Japanese Patent No. 4157227, Japanese Patent No. 4118458, JP-A-2008-74832, Japanese Patent No. 3982770, Japanese Patent No. 3801386, the pamphlet of WO 2005/028465, the pamphlet of WO 2003/042203, JP-A-2005-289812, JP-A-2005-289807, JP-A-2005-112772, Japanese Patent No. 3522189, the pamphlet of WO 2002/090342, Japanese Patent No. 3471073, JP-A-2003-277381, the pamphlet of WO 2001/060811, the pamphlet of WO 00/71544, etc. A fulgide compound, the chromene compound, and the spinooxazine compound are disclosed in many documents, such as JP-A-2-28154, JP-A-62-288830, the pamphlet of WO 94/22850, and the pamphlet of WO 96/14596.

Among known photochromic compounds, a chromene compound having an indeno[2,1-f]naphtho[1,2-b]pyran skeleton is more preferably used from the viewpoint of photochromic properties such as color optical density, initial colorability, durability, and fading speed.

In addition to the above, a photochromic compound having an oligomer chain group in the molecule can also be suitably used. Such a photochromic compound having an oligomer chain group is disclosed in many documents, such as the pamphlet of WO 2000/015630, the pamphlet of WO 2004/041961, the pamphlet of WO 2009/146509, the pamphlet of WO 2012/149599, the pamphlet of WO 2012/162725, the pamphlet of WO 2013/078086, the pamphlet of WO 2019/013249, and the pamphlet of WO 2019/203205. Of these, the photochromic compounds having an oligomer chain group in the molecule as described in the pamphlet of WO 2019/013249 or the pamphlet of WO 2019/203205 because it ensures better photochromic properties and durability are preferably used.

The photochromic compound (Component A) is preferably a compound represented by the following formula.

[CF 57]

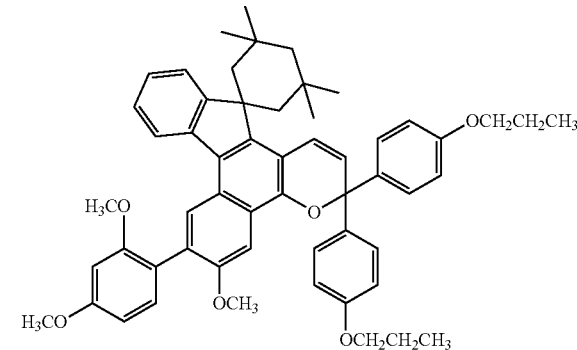

Any of the above-described various photochromic compounds (Component A) can be used alone or in combination with one or more of the other compounds. The photochromic compound may be used in a small amount, e.g., in an amount in a range of 0.001 to 10 parts by mass, particularly in a range of 0.01 to 5 parts by mass, with respect to 100 parts by mass of the total of the polyiso(thio)cyanate compound (Component B) and the active hydrogen-containing compound (Component C).

The mass proportion of the polyiso(thio)cyanate compound (Component B), the active hydrogen-containing compound (Component C), and the compound for optical materials (Component D) in the urethane-based curable composition according to the embodiment is not particularly limited. Preferably, the polyiso(thio)cyanate compound (Component B), the active hydrogen-containing compound (Component C), and the compound for optical materials (Component D) are contained in amounts in a range of 20 to 75 parts by mass, in a range of 20 to 75 parts by mass, and in a range of 5 to 40 parts by mass, respectively, with respect to 100 parts by mass of the total of the polyiso(thio)cyanate compound (Component B), the active hydrogen-containing compound (Component C), and the compound for optical materials (Component D). When the contents of the respective compounds are within these ranges, the photochromic properties and durability of a cured body tend to increase. More preferably, the polyiso(thio)cyanate compound (Component B), the active hydrogen-containing compound (Component C), and the compound for optical materials (Component D) are contained in amounts in a range of 25 to 70 parts by mass, in a range of 25 to 70 parts by mass, and in a range of 5 to 35 parts by mass, respectively. Still more preferably, the polyiso(thio)cyanate compound (Component B), the active hydrogen-containing compound (Component C), and the compound for optical materials (Component D) are contained in amounts in a range of 30 to 60 parts by mass, in a range of 30 to 60 parts by mass, and in a range of 10 to 25 parts by mass, respectively.

<Curing Accelerator (Component E)>

The urethane-based curable composition may further contain various curing accelerators (component E) depending on the types of the above-described components so as to rapidly accelerate polymerization and curing thereof. The curing accelerator (Component E) may be a urethane or urea reaction catalyst for reacting a hydroxyl group and a thiol group with an isocyanate group and an isothiocyanate group, and a condensing agent.

(Urethane or Urea Reaction Catalyst)

The urethane or urea reaction catalyst is used for poly(thio)urethane bond formation by the reaction of polyiso(thio)cyanate with polyol or polythiol. Examples of the urethane or urea reaction catalyst include tertiary amines and their corresponding inorganic or organic salts, phosphines, quaternary ammonium salts, quaternary phosphonium salts, Lewis acids, and organic sulfonic acid. Specific examples include as follows. If the catalyst activity is too high depending on the types of the above-described compounds selected, tertiary amine can be mixed with Lewis acid to suppress the catalyst activity.

Tertiary amines: triethylamine, tri-n-propylamine, triisopropylamine, tri-n-butylamine, triisobutylamine, triethylamine, hexamethylenetetramine, N,N-dimethyloctylamine, N,N,N',N'-tetramethyl-1,6-diaminohexane, 4,4'-trimethylene bis(1-methylpiperidine), 1,8-diazabicyclo-(5,4,0)-7-undecene;

Phosphines: trimethylphosphine, triethylphosphine, tri-n-propylphosphine, triisopropylphosphine, tri-n-butylphosphine, triphenylphosphine, tribenzylphosphine, 1,2-bis(diphenylphosphino) ethane, 1,2-bis(dimethylphosphino) ethane;

Quaternary ammonium salts: tetramethylammonium bromide, tetrabutylammonium chloride, tetrabutylammonium bromide;

Quaternary phosphonium salts: tetramethylphosphonium bromide, tetrabutylphosphonium chloride, tetrabutylphosphonium bromide;

Lewis acid: triphenylaluminum, dimethyltin dichloride, dimethyltin bis(isooctyl thioglycolate), dibutyltin dichloride, dibutyltin dilaurate, dibutyltin maleate, dibutyltin maleate polymer, dibutyltin diricinoleate, dibutyltin bis(dodecyl mercaptide), dibutyltin bis(isooctyl thioglycolate), dioctyltin dichloride, dioctyltin maleate, dioctyltin maleate polymer, dioctyltin bis(butyl maleate), dioctyltin dilaurate, dioctyltin diricinoleate, dioctyltin dioleate, dioctyltin di(6-hydroxy)caproate, dioctyltin bis(isooctyl thioglycolate), didodecyltin diricinoleate; and Organic sulfonic acid: methanesulfonic acid, benzenesulfonic acid, p-toluenesulfonic acid.

(Condensing Agent)

Specific examples of the condensing agent may include the following:

Inorganic acid: hydrogen chloride, hydrogen bromide, sulfuric acid, phosphoric acid, etc.;

Organic acid: p-toluenesulfonic acid, camphorsulfonic acid, etc.;

Acid ion-exchange resin: amberlite, amberlyst, etc.; and

Carbodiimide: dicyclohexylcarbodiimide, 1-ethyl-3-(3-dimethylaminopyrrolyl)-carbodiimide.

Any of the above-described various curing accelerators (Component E) can be used alone or in combination with one or more of the other accelerators. The curing accelerator may be used in a so-called catalytic amount, e.g., in a small amount in a range of 0.001 to 10 parts by mass, particularly in a range of 0.01 to 5 parts by mass, with respect to 100 parts by mass of the total of the polyiso(thio)cyanate compound (Component B) and the active hydrogen-containing compound (Component C).

<Other Additives>

The curable composition can contain, if needed, various additives known per se within a range that does not impair the effects. Examples include an ultraviolet absorber, an antistatic agent, an infrared absorber, an ultraviolet stabilizer, an antioxidant, a coloring inhibitor, an antistatic agent, an additive such as a fluorescent dye, a dye, a pigment, or a perfume, a solvent, a leveling agent, an internal mold release agent, and a polymerization modifier such as thiols like t-dodecylmercaptan.

(Stabilizer)

Above all, an ultraviolet stabilizer is suitably used in light of improving the durability of the photochromic compound (Component A). Known examples of the ultraviolet stabilizer include a hindered amine light stabilizer, a hindered phenol antioxidant, and a sulfur-based antioxidant.

Particularly suitable examples of the ultraviolet stabilizer include bis(1,2,2,6,6-pentamethyl-4-piperidyl)sebacate, 2,6-di-t-butyl-4-methyl-phenol, and ethylene bis(oxyethylene) bis[3-(5-t-butyl-4-hydroxy-m-tolyl) propionate]. The following are examples of commercially available products: ADK STAB LA-52, LA-57, LA-62, LA-63, LA-67, LA-77, LA-82, and LA-87 manufactured by ADEKA Corporation; and IRGANOX 1010, 1035, 1075, 1098, 1135, 1141, 1222, 1330, 1425, 1520, 259, 3114, 3790, 5057, and 565 manufactured by BASF Japan Ltd.

(Ultraviolet Absorber)

Further, an ultraviolet absorber is suitably used in light of improving the durability and photochromic properties of the photochromic compound (Component A). Examples of the ultraviolet absorber include a benzotriazole-based ultraviolet absorber, a triazine-based ultraviolet absorber, a benzophenone-based ultraviolet absorber, a cyanoacrylate-based ultraviolet absorber, a diphenylacrylate-based ultraviolet absorber, a phenol-based ultraviolet absorber, an oxanilide-based ultraviolet absorber, a malonic acid ester-based ultraviolet absorber, and a cinnamic acid ester-based ultraviolet absorber.

Among them, a cyanoacrylate-based ultraviolet absorber, a diphenyl acrylate-based ultraviolet absorber, a phenol-based ultraviolet absorber, an oxanilide-based ultraviolet absorber, a malonic acid ester-based ultraviolet absorber, and a cinnamic acid ester-based ultraviolet absorber are suitably used. In particular, a cinnamic acid ester-based ultraviolet absorber is especially preferred from the viewpoint of improving durability without impairing photochromic properties (in particular, color optical density) as compared with the case where the ultraviolet absorber is not used.

(Mold Release Agent)

Further, an internal mold release agent can be used if an optical article exhibits poor mold releasability. Any internal mold release agents can be used as long as they exhibit a mold release effect without impairing the physical properties, such as transparency, of resin. Preferably, a surfactant is used. Above all, a phosphate ester-based surfactant is preferred. The internal mold release agent as used herein may also include some of the above-described various catalysts that exhibit a mold release effect, such as quaternary ammonium salts and quaternary phosphonium salts. The internal mold release agent is selected as appropriate in consideration of the combination with monomer, polymerization conditions, economic efficiency, and the ease of handling. Specific examples of the phosphate ester-based internal mold release agent are as follows.

Alkyl acid phosphate: mono-n-butyl phosphate, mono-2-ethylhexyl phosphate, mono-n-octyl phosphate, mono-n-butyl phosphate, bis(2-ethylhexyl)phosphate, di(2-ethylhexyl)phosphate, di-n-octyl phosphate, di-n-butyl phosphate, butyl acid phosphate (mono-, di-mixture), ethyl acid phosphate (mono-, di-mixture), butoxyethyl acid phosphate (mono-, di-mixture), 2-ethylhexyl acid phosphate (mono-, di-mixture), isotridenic acid phosphate (mono-, di-mixture), tetracosyl acid phosphate (mono-, di-mixture), stearyl acid phosphate (mono-, di-mixture); and Other phosphate esters: oleyl acid phosphate (mono-, di-mixture), dibutyl pyrophosphate, ethylene glycol acid phosphate (mono-, di-mixture), butoxyethyl acid phosphate (mono-, di-mixture).

In order to impart a photochromic optical article with desired properties, such as blue-light blocking ability, anti-glare properties, and high contrast properties, a wavelength absorbent which absorbs light in a specific wavelength range can also be blended, if needed. For example, when a blue light absorbent having an absorption peak in a range of 400 nm to 450 nm is blended, blue light which is harmful to the eye can be blocked. When an organic coloring matter having an absorption peak in a range of 550 nm to 600 nm is blended, contrast can be enhanced to increase visibility.

(Blue Light Absorbent)

A blue light absorbent is suitably used in light of blocking blue light which is harmful to the eye. The blue light absorbent can be used without any particular limitation as long as it is a compound having an absorption peak in a range of 400 nm to 450 nm, and commercially available compounds are also available. Examples of the blue light absorbent include a perylene-based compound, a porphyrin compound, a carotenoid-based compound, and a cyanine-based compound.

Among them, a porphyrin compound is preferably used. Further, a porphyrin metal complex with a metal atom in the center can also be used. The porphyrin metal complex can be a commercially available product. Examples include FDB-001 and FDB-002 manufactured by Yamada Chemical Co., Ltd. and products manufactured by Tokyo Chemical Industry Co., Ltd.

Above all, the porphyrin compound is particularly preferably a compound represented by Formula (XVIII) below.

[CF 58]

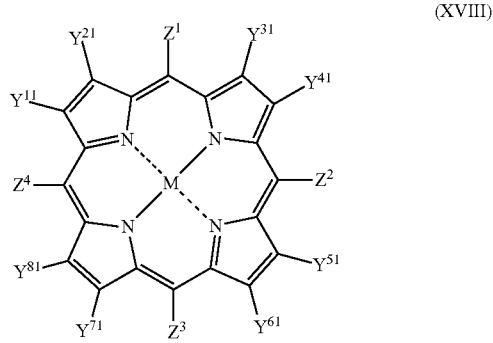

(XVIII)

In Formula (XVIII), $Y^{11}$ to $Y^{81}$ are each a substituent selected from the group consisting of: a hydrogen atom, a halogen atom, a linear, branched or cyclic alkyl group, a linear, branched or cyclic alkoxy group, a substituted or unsubstituted ethenyl group, a substituted or unsubstituted ethynyl group, a substituted or unsubstituted aryl group, a substituted or unsubstituted aryloxy group, a substituted or unsubstituted aryloxycarbonyl group, a substituted or unsubstituted alkylthio group, a substituted or unsubstituted arylthio group, a substituted or unsubstituted aralkyl group, a substituted or unsubstituted aralkyloxy group, a substituted or unsubstituted acyl group, a linear, branched or cyclic halogenoalkyl group, a linear, branched or cyclic halogenoalkoxy group, a linear, branched or cyclic alkoxyalkyl group, a linear, branched or cyclic alkoxyalkoxyalkyl group, a substituted or unsubstituted aryloxyalkyl group, a substituted or unsubstituted aralkyloxyalkyl group, and a linear, branched or cyclic halogenoalkoxyalkyl group;

adjacent groups selected from $Y^{11}$ and $Y^{81}$ may be bonded to each other to form a substituted or unsubstituted aromatic ring together with a substituted carbon atom;

$Z^1$ to $Z^4$ are each a substituted or unsubstituted aryl group; and

M is two hydrogen atoms, a divalent metal atom, a trivalent substituted metal atom, a tetravalent substituted metal atom, or a metal oxide.

In order to enhance the effects, it is preferable that:

$Y^{11}$ to $Y^{81}$ are each a hydrogen atom, a halogen atom, a linear alkyl group having 1 to 10 carbon atoms, a branched alkyl group having 3 to 10 carbon atoms, or a cyclic alkyl group having 3 to 10 carbon atoms;

$Z^1$ to $Z^4$ are each a substituted or unsubstituted aryl group; and

M is copper, magnesium, zinc, cobalt, titanium, iron, vanadium, or vanadium oxide.

More specifically, suitable examples of the porphyrin compound include a copper porphyrin complex, a vanadium porphyrin complex, a magnesium porphyrin complex, and a zinc porphyrin complex.

(Organic Coloring Matter Having Absorption Peak in Range of 550 nm to 600 nm)

In light of increasing visibility, it is suitable to use an organic coloring matter having an absorption peak in a range of 550 nm to 600 nm. Examples of such an organic coloring matter include a nitro-based compound, an azo-based compound, an anthraquinone-based compound, a slen-based compound, a porphyrin-based compound, and a rare earth metal compound. Among them, a porphyrin-based compound and a rare earth-based compound are preferred. From the viewpoint of compatibility with the curable composition, a porphyrin-based compound is most preferred.

The porphyrin-based compound may have various substituents in the porphyrin skeleton. Suitable examples include the compounds described in JP-A-5-194616, JP-A-5-195446, JP-A-2003-105218, JP-A-2008-134618, JP-A-2013-61653, JP-A-2015-180942, the pamphlet of WO 2012/020570, Japanese Patent No. 5626081, Japanese Patent No. 5619472, Japanese Patent No. 5778109 and the like. The porphyrin-based compound can be a commercially available product. Examples include FDG-005, FDG-006, FDG-007, and FDR-001 manufactured by Yamada Chemical Co., Ltd. and PD-320 manufactured by Yamamoto Chemicals Inc. Above all, the porphyrin-based compound is particularly suitably a tetraazaporphyrin compound represented by Formula (XIX) below.

[CF 59]

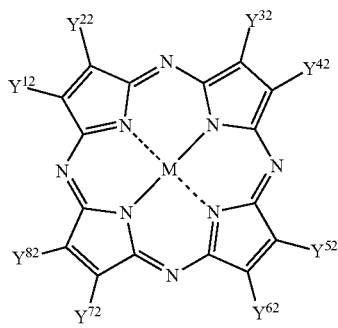

(XIX)

In Formula (XIX),
$Y^{12}$, $Y^{32}$, $Y^{52}$, and $Y^{72}$ are each a hydrogen atom;
$Y^{22}$, $Y^{42}$, $Y^{62}$, and $Y^{82}$ are each a linear or branched alkyl group having 1 to 6 carbon atoms; and
M is a divalent metal atom or an oxidized metal atom.

Examples of the linear or branched alkyl group having 1 to 6 carbon atoms include a methyl group, an ethyl group, an n-propyl group, an isopropyl group, an n-butyl group, an isobutyl group, a tert-butyl group, an n-pentyl group, an isopentyl group, a neopentyl group, a tert-pentyl group, a 1,2-dimethylpropyl group, a 1-methylbutyl group, a 2-methylbutyl group, an n-hexyl group, a 2-methylpentyl group, a 4-methylpentyl group, a 4-methyl-2-pentyl group, a 1,2-dimethylbutyl group, a 2,3-dimethylbutyl group, and a 2-ethylbutyl group.

Examples of the divalent metal atom include Cu, Zn, Fe, Co, Ni, Ru, Pd, Pt, Mn, Mg, Ti, Ba, Cd, Hg, and Sn. Examples of the oxidized metal atom include VO, MnO, and TiO.

Any of the above-described other compounding agents can be used alone or in combination with one or more of the other compounding agents. The compounding agent may be used in a small amount, e.g., in an amount of 0.0001 to 10 parts by mass, preferably in an amount of 0.001 to 10 parts by mass, with respect to 100 parts by mass of the total of the polyiso(thio)cyanate compound (Component B) and the polyol compound.

<Acrylic Curable Composition>

An acrylic curable composition contains a polymerizable monomer component. The acrylic curable composition may contain the photochromic compound (Component A), the curing accelerator (Component E), and an additive such as a stabilizer.

The compound for optical materials (Component D) can serve as the polymerizable monomer component of the acrylic curable composition. The acrylic curable composition may contain, in addition to the compound for optical materials (Component D) according to the embodiment, at least one of an acrylate compound and a methacrylate compound, i.e., a (meth)acrylate compound.

The content of the compound for optical materials (Component D) in the acrylic curable composition is preferably not less than 1% by mass, more preferably not less than 3% by mass, and still more preferably not less than 5% by mass. When the compound for optical materials (Component D) is contained in a larger amount, the photochromic properties of a cured body tends to increase. Meanwhile, from the viewpoint of enhancing the durability of the cured body, the content of the compound for optical materials is preferably not more than 50% by mass, more preferably not more than 30% by mass, and still more preferably not more than 20% by mass.

The blending amount of the compound for optical materials (Component D) with respect to 100 parts by mass of the (meth)acrylate compound is preferably not less than 1 part by mass and not more than 50 parts by mass, more preferably not less than 5 parts by mass and not more than 35 parts by mass.

The compound for optical materials (Component D) obtained when $R^4$ in Formula (Ia) is $H_2C=CH-C(=O)-$, $H_2C=C(CH_3)-C(=O)-$, or $H_2C=CH-C(=O)-OCH_2CH_2NHC(=O)-$ is particularly suitable as a material for the acrylic curable composition because it can itself function as the (meta)acrylate compound.

The content of the compound for optical materials (Component D) obtained when $R^4$ is a (meth)acrylic group may account for a large proportion of the acrylic curable composition, e.g., not less than 90% by mass and not more than 100% by mass.

<(Meth)acrylate Compound>

Examples of the (meth)acrylate compound include a bifunctional (meth)acrylic polymerizable compound, a polyfunctional (meth)acrylic polymerizable compound, and a monofunctional (meth)acrylic polymerizable compound.

Preferably, a bifunctional (meth)acrylic polymerizable compound is used.

(Bifunctional (Meth)acrylic Polymerizable Compound)

Examples of the bifunctional (meth)acrylic polymerizable compound include compounds represented by Formulas (5), (6) and (7) below.

[CF 60]

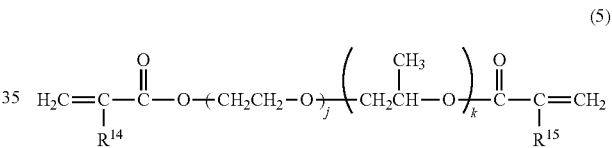

(5)

In the formula, $R^{14}$ and $R^{15}$ are each a hydrogen atom or a methyl group, and j and k are each independently an integer of 0 or more, provided that j+k is 2 or more and 50 or less on average.

The polymerizable compound represented by the above Formula (5) is usually obtained in the form of a mixture of molecules with different molecular weights. For this reason, j and k represent the average value.

Specific examples of the compound represented by the Formula (5) include diethylene glycol dimethacrylate, triethylene glycol dimethacrylate, tetraethylene glycol dimethacrylate, pentaethylene glycol dimethacrylate, pentapropylene glycol dimethacrylate, diethylene glycol diacrylate, triethylene glycol diacrylate, tetraethylene glycol diacrylate, pentaethylene glycol diacrylate, tripropylene glycol diacrylate, tetrapropylene glycol diacrylate, pentapropylene glycol diacrylate, dimethacrylate composed of a mixture of polypropylene glycol and polyethylene glycol (having two repeating units of polyethylene and two repeating units of polypropylene), polyethylene glycol dimethacrylate (especially with an average molecular weight of 330), polyethylene glycol dimethacrylate (especially with an average molecular weight of 536), polyethylene glycol dimethacrylate (especially with an average molecular weight of 736), tripropylene glycol dimethacrylate, tetrapropylene glycol dimethacrylate, polypropylene glycol dimethacrylate (especially with an average molecular weight of 536), polyethylene glycol diacrylate (especially with an average molecular weight of 258), polyethylene glycol diacrylate (especially with an average molecular weight of 308), polyethylene glycol diacrylate (especially with an average molecular weight of 508), polyethylene glycol diacrylate (especially with an average molecular weight of 708), and polyethylene glycol methacrylate acrylate (especially with an average molecular weight of 536).

[CF 61]

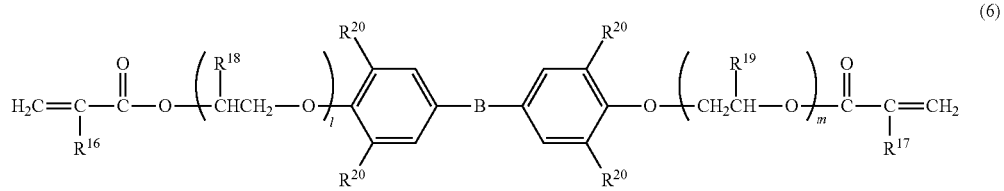

(6)

In the formula, $R^{16}$ and $R^{17}$ are each a hydrogen atom or a methyl group;

$R^{18}$ and $R^{19}$ are each a hydrogen atom or a methyl group;

$R^{20}$ is a hydrogen atom or a halogen atom;

B is one of —O—, —S—, —(SO$_2$)—, —CO—, —CH$_2$—, —CH=CH—, —C(CH$_3$)$_2$—, and —C(CH$_3$)(C$_6$H$_5$)—; and l and m are each an integer of 1 or more, provided that l+m is 2 or more and 30 or less on average.

The polymerizable compound represented by the Formula (6) is usually obtained in the form of a mixture of molecules with different molecular weights. For this reason, l and m represent the average value.

Specific examples of the compound represented by the above Formula (6) include bisphenol A di(meth)acrylate shown below.

2,2-bis[4-methacryloyloxy·ethoxy)phenyl]propane (l+m=2), 2,2-bis[4-methacryloyloxy·diethoxy)phenyl]propane (l+m=4), 2,2-bis[4-methacryloyloxy·polyethoxy)phenyl]propane (l+m=7), 2,2-bis(3,5-dibromo-4-methacryloyloxyethoxyphenyl)propane (l+m=2), 2,2-bis(4-methacryloyloxydipropoxyphenyl)propane (l+m=4), 2,2-bis[4-acryloyloxy·diethoxy)phenyl]propane (l+m=4), 2,2-bis[4-acryloyloxy·polyethoxy)phenyl]propane (l+m=3), 2,2-bis[4-acryloyloxy·polyethoxy)phenyl]propane (l+m=7), 2,2-bis[4-methacryloyloxy(polyethoxy)phenyl]propane (l+m=10), 2,2-bis[4-methacryloyloxy(polyethoxy)phenyl]propane (l+m=17), 2,2-bis[4-methacryloyloxy(polyethoxy)phenyl]propane (l+m=30), 2,2-bis[4-acryloyloxy(polyethoxy)phenyl]propane (l+m=10), and 2,2-bis[4-acryloyloxy(polyethoxy)phenyl]propane (l+m=20).

[CF 62]

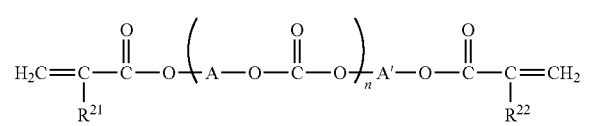

(7)

In the formula, $R^{21}$ and $R_{22}$ are each a hydrogen atom or a methyl group;

n is a number of 1 to 20 on average; and

A and A' may be the same or different from each other and are each a linear or branched alkylene group having 2 to 15 carbon atoms, and when a plurality of A are present, they may be the same or different groups.

The compound represented by Formula (7) can be produced by reacting polycarbonate diol with (meth)acrylic acid.

Examples of the polycarbonate diol for use in the production include the following: polycarbonate diol (having a number average molecular weight of 500 to 2,000) obtained by the phosgenation of polyalkylene glycol such as trimethylene glycol, tetramethylene glycol, pentamethylene glycol, hexamethylene glycol, octamethylene glycol, or nonamethylene glycol;

polycarbonate diol (having a number average molecular weight of 500 to 2,000) obtained by the phosgenation of a mixture of two or more polyalkylene glycols (e.g., a mixture of trimethylene glycol and tetramethylene glycol, a mixture of tetramethylene glycol and hexamethylene diglycol, a mixture of pentamethylene glycol and hexamethylene glycol, a mixture of tetramethylene glycol and octamethylene glycol, a mixture of hexamethylene glycol and octamethylene glycol, etc.); and polycarbonate diol (having a number average molecular weight of 500 to 2,000) obtained by the phosgenation of 1-methyltrimethylene glycol.

The (meth)acrylate compound may be a bifunctional (meth)acrylic polymerizable compound having a urethane bond.

Examples of the bifunctional (meth)acrylic polymerizable compound having a urethane bond include a product of a reaction of polyol with polyisocyanate. Examples of the polyisocyanate include hexamethylene diisocyanate, isophorone diisocyanate, lysine isocyanate, 2,2,4-hexamethylene diisocyanate, dimer acid diisocyanate, isopropylidenebis-4-cyclohexylisocyanate, dicyclohexylmethane diisocyanate, norbornene diisocyanate, norbornene methane diisocyanate, and methylcyclohexane diisocyanate.

Examples of the polyol include: polyalkylene glycol having a repeating unit of ethylene oxide, propylene oxide, or hexamethylene oxide having 2 to 4 carbon atoms; and polyester diol such as polycaprolactone diol. Examples further include polycarbonate diol, polybutadiene diol, ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol, and 1,4-cyclohexane dimethanol.

In addition, the following are also available: a reaction mixture obtained by further reacting the urethane prepolymer obtained by the reaction between the polyisocyanate and the polyol with 2-hydroxy(meth)acrylate; and urethane (meth)acrylate which is a reaction mixture obtained by directly reacting the diisocyanate with 2-hydroxy(meth)acrylate.

Examples of the bifunctional (meth)acrylic polymerizable compound having a urethane bond include: U-2PPA (molecular weight: 482), UA-122P (molecular weight: 1,100), U-122P (molecular weight: 1,100), U-108A, U-200PA, UA-511, U-412A, UA-4100, UA-4200, UA-4400, UA-2235PE, UA-160TM, UA-6100, UA-6200, U-108, UA-4000, and UA-512 manufactured by SHIN-NAKAMURA CHEMICAL Co., Ltd.; EB4858 (molecular weight: 454) manufactured by DAICEL-ALLNEX LTD.; and UX-2201, UX3204, UX4101, 6101, 7101, and 8101 manufactured by Nippon Kayaku Co., Ltd.

The (meth)acrylate compound may be a bifunctional (meth)acrylic polymerizable compound other than those described above. Examples include a compound having a (meth)acrylic group at both ends of an alkylene group which may have a substituent. Such a (meth)acrylate compound preferably has an alkylene group having 6 to 20 carbon atoms. Specific examples include 1,6-hexanedioldiacrylate, 1,6-hexanedioldimethacrylate, 1,9-nonanedioldiacrylate, 1,9-nonanedioldimethacrylate, 1,10-decanedioldiacrylate, and 1,10-decanedioldimethacrylate.

Other examples of the (meth)acrylate compound include a bifunctional (meth)acrylate monomer containing a sulfur atom. The sulfur atom preferably forms a part of the molecular chain as a sulfide group. Specific examples include bis(2-methacryloyloxyethylthioethyl)sulfide, bis(methacryloyloxyethyl)sulfide, bis(acryloyloxyethyl)sulfide, 1,2-bis(methacryloyloxyethylthio)ethane, 1,2-bis(acryloyloxyethyl)ethane, bis(2-methacryloyloxyethylthioethyl)sulfide, bis(2-acryloyloxyethylthioethyl)sulfide, 1,2-bis(methacryloyloxyethylthioethylthio)ethane, 1,2-bis(acryloyloxyethylthioethylthio)ethane, 1,2-bis(methacryloyloxyisopropylthioisopropyl)sulfide, and 1,2-bis(acryloyloxyisopropylthioisopropyl)sulfide.

For the (meth)acrylate compound, any of the above-described components can be used alone or in combination with one or more of the other components.

(Polyfunctional (Meth)acrylic Polymerizable Compound)

Next, a polyfunctional (meth)acrylic polymerizable compound will be described.

Examples of the polyfunctional (meth)acrylic polymerizable compound include a compound represented by Formula (8) below.

[CF 63]

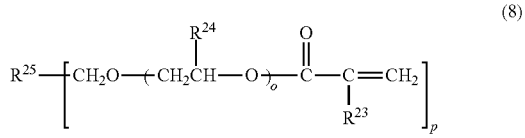

$$R^{25}\text{---}\left[CH_2O\text{---}(CH_2CH\text{---}O)_o\text{---}\overset{O}{\overset{\|}{C}}\text{---}\underset{R^{23}}{\overset{R^{24}}{C}}=CH_2\right]_p \qquad (8)$$

In the formula, $R^{23}$ is a hydrogen atom or a methyl group; $R^{24}$ is a hydrogen atom or an alkyl group having 1 to 2 carbon atoms;
$R^{25}$ is a trivalent to hexavalent organic group having 1 to 10 carbon atoms;
o is a number of 0 to 3 on average; and p is a number of 3 to 6.

The alkyl group having 1 to 2 carbon atoms represented by $R^{24}$ is preferably a methyl group. Examples of the organic group represented by $R^{25}$ include a group derived from a polyol, a trivalent to hexavalent hydrocarbon group, and a trivalent to hexavalent organic group having a urethane bond.

Specific examples of the compound represented by the above Formula (8) include trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ditrimethylolpropane tetramethacrylate, and ditrimethylolpropane tetraacrylate.

Examples of the polyfunctional (meth)acrylic polymerizable compound further include a polyfunctional (meth)acrylic polymerizable compound having a urethane bond.

The polyfunctional (meth)acrylic polymerizable compound having a urethane bond is a compound having three or more (meth)acrylate groups in the molecule, which is obtained by reacting a polyisocyanate compound with a polyol compound such as glycerin, trimethylolpropane, pentaerythritol, or dipentaerythritol as described for the bifunctional (meth)acrylic polymerizable compound having a urethane bond. The following are examples of commercially available products: U-4HA (molecular weight: 596; number of functional groups: 4), U-6HA (molecular weight: 1,019; number of functional groups: 6), U-6LPA (molecular weight: 818; number of functional groups: 6), and U-15HA (molecular weight: 2,300; number of functional groups: 15) manufactured by SHIN-NAKAMURA CHEMICAL Co., Ltd.

The polyfunctional (meth)acrylic polymerizable compound may be a compound other than those described above. Examples include a compound obtained by modifying an end of a polyester compound with a (meth)acrylic group. Various commercially available polyester (meth)acrylate compounds can be used depending on the molecular weight of a polyester compound as a raw material and the amount of modification with a (meth)acrylic group. Specific examples include a tetrafunctional polyester oligomer (molecular weight: 2,500 to 3,500; EB80 manufactured by DAICEL-ALLNEX LTD., etc.), a hexafunctional polyester oligomer (molecular weight: 6,000 to 8,000; EB450 manufactured by DAICEL-ALLNEX LTD., etc.), a hexafunctional polyester oligomer (molecular weight: 45,000 to 55,000; EB1830 manufactured by DAICEL-ALLNEX LTD., etc.), and a tetrafunctional polyester oligomer (especially GX8488B with a molecular weight of 10,000 manufactured by DKS Co, Ltd., etc.)

With the use of the polyfunctional (meth)acrylic polymerizable compound described above, the cross-linking density is increased by polymerization, thereby improving the surface hardness of a cured body to be obtained. Thus, it is preferable to use the polyfunctional (meth)acrylic polymerizable compound especially when a coating method is used to obtain a photochromic cured body (laminate).

For the polyfunctional (meth)acrylic polymerizable compound, any of the above-described components can be used alone or in combination with one or more of the other components.

(Monofunctional (Meth)acrylic Polymerizable Compound)

Next, a monofunctional (meth)acrylic polymerizable compound will be described.

Examples of the monofunctional (meth)acrylic polymerizable compound include a compound represented by Formula (9) below.

[CF 64]

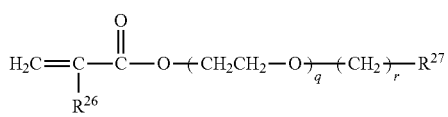

(9)

In the formula, $R^{26}$ is a hydrogen atom or a methyl group; $R^{27}$ is a hydrogen atom, a methyldimethoxysilyl group, a trimethoxysilyl group, or a glycidyl group;

q is an integer of 0 to 10; and r is an integer of 0 to 20.

Specific examples of the compound represented by the above Formula (9) include the following: methoxy polyethylene glycol methacrylate (especially with an average molecular weight of 293), methoxy polyethylene glycol methacrylate (especially with an average molecular weight of 468), methoxy polyethylene glycol acrylate (especially with an average molecular weight of 218), methoxy polyethylene glycol acrylate (especially with an average molecular weight of 454), stearyl methacrylate, lauryl methacrylate, methyl acrylate, ethyl acrylate, butyl acrylate, octyl acrylate, lauryl acrylate, γ-methacryloyloxypropyltrimethoxysilane, γ-methacryloyloxypropylmethyldimethoxysilane, and glycidyl methacrylate.

<Curing Accelerator (Component E)>

The curing accelerator (Component E) can be at least one of a thermal polymerization initiator and a photopolymerization initiator.

Examples of the thermal polymerization initiator include diacyl peroxides, such as benzoyl peroxide, p-chlorobenzoyl peroxide, decanoyl peroxide, lauroyl peroxide, and acetyl peroxide.

Examples further include peroxy esters, such as t-butylperoxy-2-ethylhexanate, t-butylperoxyneodecanoate, cumylperoxyneodecanoate, and t-butylperoxybenzoate.

Examples further include percarbonates, such as diisopropyl peroxydicarbonate and di-sec-butyl peroxydicarbonate.

Examples further include azo compounds, such as azobisisobutyronitrile and 2,2'-azobis(2,4-dimethylvaleronitrile).

Examples of the photopolymerization initiator include acetophenone-based compounds, such as 1-phenyl-2-hydroxy-2-methylpropane-1-one, 1-hydroxycyclohexyl phenyl ketone, and 1-(4-isopropylphenyl)-2-hydroxy-2-methylpropane-1-one.

Examples further include α-dicarbonyl-based compounds, such as 1,2-diphenylethanedione and methyl phenylglycoxylate.

Examples further include acylphosphine oxide-based compounds, such as 2,6-dimethylbenzoyldiphenylphosphine oxide, 2,4,6-trimethylbenzoyldiphenylphosphine oxide, 2,4,6-trimethylbenzoyldiphenylphosphinic acid methyl ester, 2,6-dichlorbenzoyldiphenylphosphine oxide, 2,6-dimethoxybenzoyldiphenylphosphine oxide, and phenylbis(2,4,6-trimethylbenzoyl) phosphine oxide.

The photopolymerization initiator can be used in combination with a known polymerization-curing acceleration aid such as a tertiary amine.

The acrylic polymerizable composition may further contain the photochromic compound (Component A), the curing accelerator (Component E), other additives and the like in the amounts described above for the urethane-based polymerizable composition.

[Method for Producing Curable Composition]

The curable composition is obtained by mixing the compound for optical materials (Component D) and the polyiso(thio)cyanate compound (Component B) by a known method. The curable composition may contain the photochromic compound (Component A), the active hydrogen-containing compound (Component C), the curing accelerator (Component E), other additives and the like.

For example, the active hydrogen-containing compound (Component C) may be added to the mixture of the polyiso(thio)cyanate compound (Component B) and the compound for optical materials (Component D), followed by stirring, resulting in the urethane-based curable composition. The stirring temperature and the stirring time may be adjusted as appropriate in a range of 0° C. to 100° C. and in a range of 0.1 to 48 hours, respectively. In order to suppress moisture intrusion, the production is preferably carried out under an atmosphere of inert gas such as argon or nitrogen.

In the production of the urethane-based curable composition, as soon as the polyiso(thio)cyanate compound (Component B) and the active hydrogen-containing compound (Component C) are mixed together, a polymerization reaction starts to form a cured body. Thus, the urethane-based curable composition is preferably prepared just before a cured body is to be obtained. For the preparation of the urethane-based curable composition, a preparation kit may be used, which includes, for example, a first container containing the polyiso(thio)cyanate compound (Component B) and a second container containing a mixture of the active hydrogen-containing compound (Component C), the compound for optical materials (Component D), and other optional components. With the use of such a preparation kit, the contents of the first container and the second container can be mixed and stirred to prepare the urethane-based curable composition at a desired timing.

The acrylic curable composition is obtained by mixing a polymerizable monomer component containing the compound for optical materials (Component D) by a known method. The acrylic curable composition may contain the photochromic compound (Component A), the curing accelerator (Component E), the additive and the like.

[Cured Body]

When the curable composition is cured, a cured body is obtained. The curable composition is cured, for example, by radical polymerization, ring-opening polymerization, anionic polymerization, or condensation polymerization by irradiation with active energy rays such as ultraviolet rays, α rays, β rays, and γ rays, by heat, or by a combination of both.

For example, a cured body is obtained by thermal polymerization of the curable composition. Upon thermal polymerization of the curable composition, especially the temperature affects the properties of a cured body to be obtained. The temperature conditions are not uniquely defined, since they vary depending on the type and amount of the thermal polymerization initiator and the type of the compound. In general, it is suitable to start polymerization at a relatively low temperature, which is then slowly increased. The polymerization time, just like the temperature, also varies depending on various factors. Thus, it is suitable that the optimal time is determined in advance based on the conditions. In general, it is preferable to determine the polymerization time so that polymerization is completed in 2 to 48 hours.

[Method for Producing Optical Article]

An optical article such as a lens contains the cured body of the curable composition. In particular, the cured body according to the embodiment is suitably used for a photochromic optical article. A photochromic optical article contains the cured body of the curable composition that contains the photochromic compound (Component A). Examples of the photochromic optical article include a photochromic lens. A photochromic lens can be produced by a known method such as a kneading method, a cast polymerization method, a glass bonding method, or a binder method.

With the use of the kneading method, the photochromic optical article can be produced in the following manner, for example: The curable composition containing the photochromic compound is injected between glass molds held by an elastomer gasket or a spacer, and is sufficiently defoamed, followed by polymerization by heating in an air furnace or in water, thereby providing a photochromic cured body (photochromic optical article) molded in the form of an optical material such as a lens.

With the use of the cast polymerization method using an inner mold, the optical article can be produced in the following manner, for example: The curable composition containing the photochromic compound is injected into a predetermined cavity formed by properly disposing an optical base material like a lens base material, followed by polymerization by heating, thereby providing a photochromic lens in which a photochromic layer is formed on the surface of the optical base material (laminate in which the photochromic optical article is laminated).

The optical base material is not particularly limited, and a known plastic optical base material is available. Specific examples include plastic materials such as a (meth)acrylic resin, a polycarbonate-based resin, an allyl-based resin, a thiourethane-based resin, a urethane-based resin, and a thioepoxy-based resin.

In the case of forming the photochromic layer on the surface of the optical base material by the cast polymerization method as described above, the surface of the optical base material may be subjected in advance to a chemical treatment with an alkaline solution, an acid solution or the like, or a physical treatment by corona discharge, plasma discharge, polishing or the like, thereby enhancing the adhesion between the photochromic layer and the optical base material. Needless to note, it is also possible to provide a transparent adhesive resin layer on the surface of the optical base material.

With the use of the glass bonding method, the photochromic optical article can be produced in the following manner, for example: One of paired optical base materials like glass disposed with a spacer therebetween is coated with a necessary amount of the curable composition containing the photochromic compound, and the other optical base material like glass is placed on this coating film, followed by curing of the coating film, whereby the paired optical base materials like glass are joined together.

With the use of the binder method, the photochromic lens can be produced in the following manner: First, a base material is coated with the photochromic curable composition, followed by drying of this coating film to form an adhesive layer sheet, and the thus-obtained photochromic sheet is sandwiched between two optical sheets, which are joined together by application of pressure, whereby a photochromic laminate is obtained in which the two optical sheets are joined together via the adhesive layer containing the photochromic compound.

For the preparation of the adhesive layer sheet, it is also possible to use a coating liquid obtained by dissolving the photochromic curable composition in an organic solvent.

The thus-produced photochromic laminate is mounted in a mold, for example, followed by injection molding of a thermoplastic resin (e.g., polycarbonate) for an optical base material like a lens, thereby obtaining a photochromic lens of a given shape on which the photochromic laminate is laminated. Alternatively, the photochromic laminate can be made to adhere to the surface of the optical base material like a lens by an adhesive or the like, thereby obtaining a photochromic lens.

When a photochromic lens is produced in the above-described manner, the adhesive is preferably a polyurethane-based adhesive. The adhesive preferably contains a urethane- or urea-based polymerizable compound, and more preferably contains a urethane-based polymerizable compound. Using a polyurethane-based adhesive contributes to enhancing the adhesion to the optical base material.

The thus-obtained photochromic cured body/laminate can exhibit photochromic properties excellent in color optical density, fading speed and the like, and thus is effectively used to produce an optical base material with photochromic properties, e.g., a photochromic lens (photochromic optical article).

Depending on the intended use, the photochromic cured body can be laminated with other functional layers or dyed with a dyestuff such as a dispersive dye within a range that does not impair the effects of the present invention. Further, the photochromic cured body can be hard coated with a silane coupling agent or a hard coating agent composed mainly of a sol of silicon, zirconium, antimony, aluminum, tin, or tungsten. Furthermore, a thin film can be formed by vapor deposition of a metal oxide such as $SiO_2$, $TiO_2$, or $ZrO_2$. The photochromic cured body can be subjected to an antireflection treatment using a thin film coating of an organic polymer, and/or an antistatic treatment and the like.

Examples of the other functional layers to be laminated include a polarizing film, which is laminated for the purpose of imparting the photochromic cured body with polarization properties. The location of the polarizing film is not particularly limited. The polarizing film may be laminated on the outer side of the photochromic cured body, between the photochromic cured body and another layer, or inside the adhesive layer, if any. From the viewpoint of adhesiveness, the polarizing film is preferably embedded in the adhesive layer, if any.

The method of laminating the polarizing film is not particularly limited, and a known method is available. For example, in the case of using the cast polymerization method as described above, when the photochromic curable composition is injected into a glass mold, the polarizing film is disposed between a front or rear mold and the photochromic curable composition, or inside the photochromic composition, followed by polymerization of the photochromic curable composition.

In the case of using the glass bonding method, it is preferable that the polarizing film is laminated in advance on the surface of one of the optical base materials of inorganic glass. Upon lamination of the polarizing film, a known thermosetting adhesive or ultraviolet (UV) curable adhesive may be used to allow the polarizing film to adhere to the optical base material of inorganic glass.

The polarizing film is not particularly limited, and a commercially available polarizing film is available.

The thickness of the polarizing film is suitably 20 to 100 μm. The polarizing film is a stretched film of polyvinyl alcohol dyed with a dichroic substance such as iodine or a dichroic dye, for example.

The dichroic dye to be contained in the polarizing film can be any commercially available dichroic dye. For example, azo-based and anthraquinone-based dyes are available. Specific examples include Chlorantine Fast Red (C.I. 28160), Congo Red (C.I. 22120), Brilliant Blue B (C.I. 24410), Benzopurpurine (C.I. 23500), Chlorazol Black BH (C.I. 22590), Direct Blue 2B (C.I. 22610), Diamine Green (C.I. 30295), Chrysophenine (C.I. 24895), Sirius Yellow (C.I. 29000), Direct Fast Red (C.I. 23630), Acid Black (C.I. 20470), Direct Sky Blue (C.I. 24400), Solophenyl Blue 4GL (C.I. 34200), Direct Copper Blue 2B (C.I. 24185), and Nippon Brilliant Violet BKconc (C.I. 27885). Two or more dyes can be selected from these dichroic dyes according to the purpose. Note that the numbers in parentheses are Colour Index No. shown in "New Dye Handbook" (Maruzen Co., Ltd.; 1970) edited by The Society of Synthetic Organic Chemistry, Japan.

The above-described photochromic curable composition enables even a polarizing film with a luminous transmittance of 10% to 60% and a polarization degree of 70.0 to 99.9 to be joined to the cured body, which is usually difficult to achieve.

In order to improve the function and adhesiveness of the polarizing film, a cellulose triacetate film may be laminated on both surfaces of the polarizing film. The thickness of the cellulose triacetate film is preferably 20 to 200 μm, more preferably 20 to 100 μm.

For the purpose of adjusting the amount of moisture contained in the polarizing film and ensuring the dimensional stability of the polarizing film, the polarizing film may be subjected to a heat treatment at 40° C. to 100° C. for about 5 seconds to 30 minutes before the production of the photochromic cured body of the present invention.

EXAMPLES

Hereinafter, the present invention will be described in detail by way of Examples, though the present invention is not limited to these Examples.

[Synthesis of Compounds (7a) to (23a) for Optical Materials]

The following raw materials were used for synthesis.

TDMP: tridecyl(3-mercaptopropionate) represented by Formula (10) below (manufactured by Yodo Kagaku Co., Ltd.);
PEMP: pentaerythritol tetrakis(3-mercaptopropionate) represented by Formula (11) below (manufactured by SC Organic Chemical Co., Ltd.);
BLEMMER-AE-400: polyethylene glycol monoacrylate represented by Formula (12) below (manufactured by NOF CORPORATION);
TMMP: trimethylolpropane tris(3-mercaptopropionate);
Neutral alumina: MP Alumina N-Super I (sold by FUJI-FILM Wako Pure Chemical Corporation);
Pluronic® L31: polyethylene glycol polypropylene glycol polyethylene glycol (Sigma-Aldrich Co., LLC; weight average molecular weight: 1100);
Pluronic® L34: polyethylene glycol polypropylene glycol polyethylene glycol (Sigma-Aldrich Co., LLC; weight average molecular weight: 1600);
Pluronic® L35: polyethylene glycol polypropylene glycol polyethylene glycol (Sigma-Aldrich Co., LLC; weight average molecular weight: 1900);
Pluronic® L44: polyethylene glycol polypropylene glycol polyethylene glycol (Sigma-Aldrich Co., LLC; weight average molecular weight: 2000);
Pluronic® L64: polyethylene glycol polypropylene glycol polyethylene glycol (Sigma-Aldrich Co., LLC; weight average molecular weight: 2900); and
Me-β-CD: degree of methylation: 1.5/glucose unit; molecular weight: 1282 (sold by JUNSEI CHEMICAL CO., LTD.)

The compounds obtained were dissolved in deuterated chloroform, followed by identification by a $^1$H-nuclear magnetic resonance spectrum measuring apparatus (JNM-ECA400II manufactured by JEOL Ltd.; 400 MHz; reference material: TMS).

[CF 65]

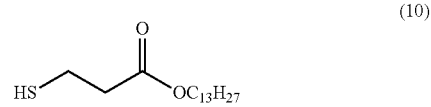

(10)

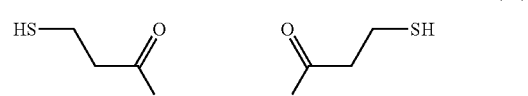

(11)

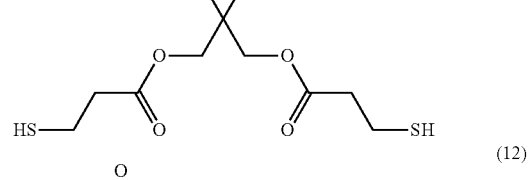

(12)

Example 1

Synthesis of Compound (7a)

TDMP (6.9 g; 23.9 mmol) and AE-400 (12.2 g; 23.9 mmol) were uniformly mixed together, to which 15 g of neutral alumina was added, followed by stirring at room temperature for five hours under a nitrogen atmosphere. After the completion of the reaction, 150 mL of toluene was added to the mixture, followed by stirring for five minutes. Thereafter, the neutral alumina was filtered off (PTFE; 0.5 μm), and the solvent was distilled off under reduced pressure to give Compound (7a) (yield: 99%).

For Compound (7a), the proton nuclear magnetic resonance spectrum was measured. The following peaks were observed:

δ 0.85 (m; 9H), 1.26 (br-m; 14H), 1.61 (m; 2H), 1.63 (t; 1H), 2.65-2.78 (m; 8H), 3.60-3.679 (m; 38H), 4.11 (m; 2H), and 4.31 (m; 2H).

Example 2

Synthesis of Compound (8a)

PEMP (5.8 g; 12.0 mmol) and AE-400 (12.2 g; 23.9 mmol) were uniformly mixed together, to which 15 g of neutral alumina was added, followed by stirring at room temperature for five hours under a nitrogen atmosphere. After the completion of the reaction, 150 mL of toluene was added to the mixture, followed by stirring for five minutes. Thereafter, the neutral alumina was filtered off (PTFE; 0.5

µm), and the solvent was distilled off under reduced pressure to give Compound (8a) (yield: 99%).

For Compound (8a), the proton nuclear magnetic resonance spectrum was measured. The following peaks were observed:

δ 1.63 (t; 4H), 2.68 to 2.78 (m; 24H), 3.60 to 3.79 (m; 76H), 4.19 (s; 8H), and 4.31 (m; 4H).

Example 3

Synthesis of Compound (9a)

PEMP (2.9 g; 6.0 mmol) and AE-400 (12.2 g; 23.9 mmol) were uniformly mixed together, to which 15 g of neutral alumina was added, followed by stirring at room temperature for five hours under a nitrogen atmosphere. After the completion of the reaction, 150 mL of toluene was added to the mixture, followed by stirring for five minutes. Thereafter, the neutral alumina was filtered off (PTFE; 0.5 µm), and the solvent was distilled off under reduced pressure to give Compound (9a) (yield: 99%).

For Compound (9a), the proton nuclear magnetic resonance spectrum was measured. The following peaks were observed:

δ 1.63 (t; 4H), 2.68 to 2.78 (m; 32H), 3.60 to 3.79 (m; 152H), 4.19 (s; 8H), and 4.31 (m; 8H).

Example 4

Synthesis of Compound (10a)

Pluronic® L-31 (14.3 g; 13.0 mmol) and toluenesulfonic acid monohydrate (0.74 g; 3.9 mmol) were dissolved in 120 mL of toluene, to which 3-mercaptopropionic acid (4.1 g; 39.0 mmol) was added, followed by heating and refluxing at 130 degrees for 10 hours, whereby the mixture was dehydrated and condensed. After the reaction, the solvent was distilled off under reduced pressure, and the residue was dissolved in dichloromethane. Thereafter, an organic layer was washed with 1% aqueous ammonia, followed by washing three times with ion-exchanged water. Then, the organic layer was dried over magnesium sulfate, and the solvent was distilled off under reduced pressure to give a 3-mercaptopropionic acid ester of Pluronic® L-31 (yield: 95%).

Subsequently, the thus-obtained 3-mercaptopropionic acid ester (15.3 g; 12.0 mmol) of Pluronic® L-31 was uniformly mixed with AE-400 (12.2 g; 23.9 mmol), to which 15 g of neutral alumina was added, followed by stirring at room temperature for five hours under a nitrogen atmosphere. After the completion of the reaction, 150 mL of toluene was added to the mixture, followed by stirring for five minutes. Thereafter, the neutral alumina was filtered off (PTFE; 0.5 µm), and the solvent was distilled off under reduced pressure to give Compound (10a) (yield: 99%).

For Compound (10a), the proton nuclear magnetic resonance spectrum was measured. The following peaks were observed:

δ 1.14 (m; 48H), 2.68 to 2.81 (m; 16H), 3.40 to 3.70 (m; 128H), and 4.10 to 4.30 (m; 8H).

Example 5

Synthesis of Compound (11a)

Pluronic® L-34 (64.0 g; 40.0 mmol) and sodium hydroxide (0.8 g; 20.0 mmol) were dissolved in 150 mL of a mixed solvent of tetrahydrofuran/water (2:1), to which acrylic acid chloride (1.8 g; 20.0 mmol) was added, followed by stirring at room temperature for 15 hours. After the reaction, the mixture was extracted with chloroform, and an organic layer was washed three times with water. The organic layer was dried over magnesium sulfate, and the solvent was distilled off under reduced pressure to give Pluronic® L-34 monoacrylate (yield: 85%).

TMMP (3.19 g; 8.0 mmol) and the Pluronic® L-34 monoacrylate (39.5 g; 23.9 mmol) were uniformly mixed together, to which 15 g of neutral alumina was added, followed by stirring at room temperature for five hours under a nitrogen atmosphere. After the completion of the reaction, 150 mL of toluene was added to the mixture, followed by stirring for five minutes. Thereafter, the neutral alumina was filtered off (PTFE; 0.5 µm), and the solvent was distilled off under reduced pressure to give Compound (11a) (yield: 99%).

For Compound (11a), the proton nuclear magnetic resonance spectrum was measured. The following peaks were observed:

δ 0.91 (t, J=8 Hz; 3H), 1.14 (m; 144H), 1.50 (q, J=8 Hz; 2H), 2.68 to 2.81 (m; 24H), 3.40 to 3.70 (m; 306H), 4.08 (s; 6H), and 4.31 (m; 6H).

Example 6

Synthesis of Compound (12a)

Pluronic® L-34 monoacrylate was prepared in the same manner as in Example 5. PEMP (2.9 g; 6.0 mmol) and the Pluronic® L-34 monoacrylate (39.5 g; 23.9 mmol) were uniformly mixed together, to which 15 g of neutral alumina was added, followed by stirring at room temperature for five hours under a nitrogen atmosphere. After the completion of the reaction, 150 mL of toluene was added to the mixture, followed by stirring for five minutes. Thereafter, the neutral alumina was filtered off (PTFE; 0.5 µm), and the solvent was distilled off under reduced pressure to give Compound (12a) (yield: 99%).

For Compound (12a), the proton nuclear magnetic resonance spectrum was measured. The following peaks were observed:

δ 1.14 (m; 192H), 2.68 to 2.78 (m; 32H), 3.40 to 3.70 (m; 408H), 4.19 (s; 8H), and 4.31 (m; 8H).

Example 7

Synthesis of Compound (13a)

Pluronic® L-34 monoacrylate was prepared in the same manner as in Example 5. DPMP (3.15 g; 4.0 mmol) and the Pluronic® L-34 monoacrylate (39.5 g; 23.9 mmol) were uniformly mixed together, to which 15 g of neutral alumina was added, followed by stirring at room temperature for five hours under a nitrogen atmosphere. After the completion of the reaction, 150 mL of toluene was added to the mixture, followed by stirring for five minutes. Thereafter, the neutral alumina was filtered off (PTFE; 0.5 µm), and the solvent was distilled off under reduced pressure to give Compound (13a) (yield: 99%).

For Compound (13a), the proton nuclear magnetic resonance spectrum was measured. The following peaks were observed:

δ 1.14 (m; 288H), 2.68 to 2.78 (m; 48H), 3.40 to 3.70 (m; 636H), 4.16 (s; 12H), and 4.31 (m; 12H).

Example 8

Synthesis of Compound (14a)

Sodium hydride (0.57 g; 23.9 mmol) was dispersed in dry THF (150 mL), to which Pluronic® L-34 (38.2 g; 23.9 mmol) was added, followed by stirring at room temperature for 30 minutes. Thereafter, pentaerythrityl tetrabromide (2.33 g; 6.0 mmol) was added to the mixture, followed by stirring at room temperature for two hours under a nitrogen atmosphere. After the completion of the reaction, ion-exchanged water was added to stop the reaction, and the mixture was extracted with dichloromethane. An organic layer was washed three times with water, and then the solvent was distilled off under reduced pressure to give Compound (14a) (yield: 85%).

For Compound (14a), the proton nuclear magnetic resonance spectrum was measured. The following peaks were observed:

δ 1.14 (m; 192H), and 3.40 to 3.70 (m; 424H).

Example 9

Synthesis of Compound (15a)

The same treatment as in Example 8 was performed, except that Pluronic® L-34 was replaced by Pluronic® L-35 (45.4 g; 23.9 mmol), thereby synthesizing Compound (15a) (yield: 82%).

For Compound (15a), the proton nuclear magnetic resonance spectrum was measured. The following peaks were observed:

δ 1.14 (m; 192H), and 3.40 to 3.70 (m; 520H).

Example 10

Synthesis of Compound (16a)

The same treatment as in Example 8 was performed, except that Pluronic® L-34 was replaced by Pluronic® L-44 (47.8 g; 23.9 mmol), thereby synthesizing Compound (16a) (yield: 82%).

For Compound (16a), the proton nuclear magnetic resonance spectrum was measured. The following peaks were observed:

δ 1.14 (m; 252H), and 3.40 to 3.70 (m; 548H).

Example 11

Synthesis of Compound (17a)

The same treatment as in Example 8 was performed, except that Pluronic® L-34 was replaced by Pluronic® L-64 (69.3 g; 23.9 mmol), thereby synthesizing Compound (17a) (yield: 80%).

For Compound (17a), the proton nuclear magnetic resonance spectrum was measured. The following peaks were observed:

δ 1.14 (m; 360H), and 3.40 to 3.70 (m; 784H).

Example 12

Synthesis of Compound (18a)

Sodium hydride (0.57 g; 23.9 mmol) was dispersed in dry THF (150 mL), to which pentaerythritol (0.82 g; 6.0 mmol) was added, followed by stirring at room temperature for 30 minutes. Thereafter, propylene oxide (11.1 g; 192 mmol) was added to the mixture, followed by stirring at room temperature for two hours under a nitrogen atmosphere. After the completion of the reaction, polyethylene glycol monotosylate (average number of oxyethylene units: 7; 11.3 g; 23.9 mmol) was added, followed by stirring at room temperature for 18 hours. Thereafter, ion-exchanged water was added to stop the reaction, and the mixture was extracted with dichloromethane. An organic layer was washed three times with water, and then the solvent was distilled off under reduced pressure to give Compound (18a) (yield: 85%).

For Compound (18a), the proton nuclear magnetic resonance spectrum was measured. The following peaks were observed:

δ 1.14 (m; 96H), and 3.40 to 3.70 (m; 216H).

Example 13

Synthesis of Compound (19a)

Sodium hydride (0.57 g; 23.9 mmol) was dispersed in dry THF (150 mL), to which pentaerythritol (0.82 g; 6.0 mmol) was added, followed by stirring at room temperature for 30 minutes. Thereafter, propylene oxide (22.2 g; 384 mmol) was added to the mixture, followed by stirring at room temperature for two hours under a nitrogen atmosphere. After the completion of the reaction, polyethylene glycol monotosylate (average number of oxyethylene units: 10; 14.2 g; 23.9 mmol) was added, followed by stirring at room temperature for 18 hours. Thereafter, ion-exchanged water was added to stop the reaction, and the mixture was extracted with dichloromethane. An organic layer was washed three times with water, and then the solvent was distilled off under reduced pressure to give Compound (19a) (yield: 82%).

For Compound (19a), the proton nuclear magnetic resonance spectrum was measured. The following peaks were observed:

δ 1.14 (m; 192H), and 3.40 to 3.70 (m; 360H).

Example 14

Synthesis of Compound (20a)

PE-4A (2.9 g; 6.0 mmol) and 11-mercapto-1-undecanol (4.9 g; 23.9 mmol) were uniformly mixed together, to which 15 g of neutral alumina was added, followed by stirring at room temperature for five hours under a nitrogen atmosphere. After the completion of the reaction, 150 mL of toluene was added to the mixture, followed by stirring for five minutes. Thereafter, the neutral alumina was filtered off (PTFE; 0.5 μm), and the solvent was distilled off under reduced pressure to give Compound (20a) (yield: 99%).

For Compound (20a), the proton nuclear magnetic resonance spectrum was measured. The following peaks were observed:

δ 1.20 to 1.58 (m; 72H), 2.68 to 2.78 (m; 24H), 3.60 (t; 8H), and 4.19 (s; 8H).

Example 15

Synthesis of Compound (21a)

PE-4A (2.9 g; 6.0 mmol) and 12-amino-1-dodecanol (4.8 g; 23.9 mmol) were uniformly mixed together, to which 15 g of neutral alumina was added, followed by stirring at room temperature for five hours under a nitrogen atmosphere. After the completion of the reaction, 150 mL of toluene was added to the mixture, followed by stirring for five minutes. Thereafter, the neutral alumina was filtered off (PTFE; 0.5 μm), and the solvent was distilled off under reduced pressure to give Compound (21a) (yield: 99%).

For Compound (21a), the proton nuclear magnetic resonance spectrum was measured. The following peaks were observed:

δ 1.20 to 1.58 (m; 80H), 2.05 (br-s; 4H), 2.68 to 2.78 (m; 24H), 3.60 (t; 8H), and 4.19 (s; 8H).

Example 16

Synthesis of Compound (22a)

Me-β-CD (16.7 g; 13.0 mmol) and toluenesulfonic acid monohydrate (0.74 g; 3.9 mmol) were dissolved in 120 mL of toluene, to which 3-mercaptopropionic acid (4.1 g; 39.0 mmol) was added, followed by heating and refluxing at 130 degrees for 10 hours, whereby the mixture was dehydrated and condensed. After the reaction, the solvent was distilled off under reduced pressure, and the residue was dissolved in dichloromethane. Thereafter, an organic layer was washed with 1% aqueous ammonia, followed by washing three times with ion-exchanged water. Then, the organic layer was dried over magnesium sulfate, and the solvent was distilled off under reduced pressure to give Me-β-CD in which 95% of the total hydroxyl groups were esterified with 3-mercaptopropionic acid. Further, Pluronic® L-34 monoacrylate was prepared in the same manner as described in Example 5.

Subsequently, the 3-mercaptopropionic acid ester (25.4 g; 12.0 mmol) of the thus-obtained Me-β-CD was uniformly mixed with the Pluronic® L-34 monoacrylate (39.5 g; 23.9 mmol), to which 15 g of neutral alumina was added, followed by stirring at room temperature for five hours under a nitrogen atmosphere. After the completion of the reaction, 150 mL of toluene was added to the mixture, followed by stirring for five minutes. Thereafter, the neutral alumina was filtered off (PTFE; 0.5 μm), and the solvent was distilled off under reduced pressure to give Compound (22a) (yield: 99%).

For Compound (22a), the proton nuclear magnetic resonance spectrum was measured. The following peaks were observed:

1.14 (m; 480H), 2.68 to 2.78 (m; 80H), 3.10 to 3.71 (m; 1100H), and 4.31 (m; 20H).

Example 17

Synthesis of Compound (23a)

Compound (14a) (6.5 g; 1.0 mmol) synthesized in Synthesis Example 8 was dissolved in 50 mL of dry toluene, to which 5 mg of dibutylhydroxytoluene (polymerization inhibitor) was added, followed by dropwise addition of 0.73 g (5.1 mmol) of 2-acryloyloxyethyl isocyanate. As a catalyst, 10 mg of dibutyltin dilaurate was added to the mixture, followed by heating and stirring at 70° C. for four hours. The resultant solution was added dropwise into hexane and stirred vigorously. Then, a phase-separated hexane layer was subjected to decantation to give Compound (23a) (yield: 95%).

For Compound (23a), the proton nuclear magnetic resonance spectrum was measured. The following peaks were observed:

δ 1.14 (m; 192H), 3.40-3.70 (m; 424H), 4.15 (m; 8H), 4.31 (m; 8H), 5.84 (d, J=10 Hz; 4H), 6.16 (dd, J=10 Hz, 17 Hz; 4H), and 6.43 (d, J=17 Hz; 4H).

[Curable Composition and Cured Body]
<Production of Urethane-Based Curable Composition and Cured Body>

Next, Compounds (7a) to (23a) obtained in Examples 1 to 17 were used to produce photochromic optical articles. The following materials and evaluation methods were used.

<Photochromic Compound (Component A)>
PC1: compound represented by the following formula:

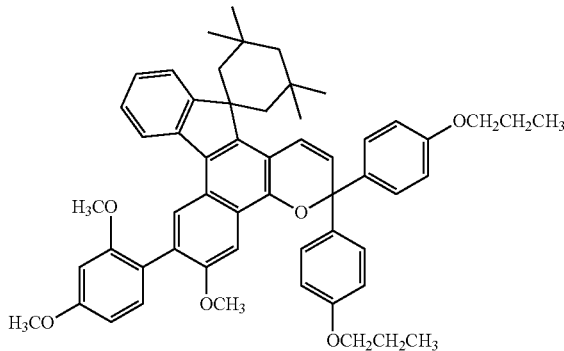

[CF 57]

<Polyisocyanate Compound (Component B)>
H6XDI: 1,3-bis(isocyanatomethyl)cyclohexane (isomeric mixture);
NBDI: norbornane diisocyanate;
IPDI: isophorone diisocyanate; and
XDI: m-xylylene diisocyanate.
<Active Hydrogen-Containing Compound (Component C):Polythiol Compound>
TMMP: trimethylolpropane tris(3-mercaptopropionate);
PEMP: pentaerythritol tetrakis(3-mercaptopropionate); and
DPMP: dipentaerythritol hexakis(3-mercaptopropionate).
<Compound for Optical Materials (Component D)>
Compounds (7a) to (22a).
<Curing Accelerator (Component E)>
E1: dimethyldichlorotin.
<Other Compounding Ingredients>
HP: stabilizer, ethylenebis(oxyethylene)bis[3-(5-tert-butyl-4-hydroxy-m-tolyl)propionate];
Dye 1: tetraazaporphyrin compound, FDG-006 (absorption wavelength: 585 nm; Yamada Chemical Co., Ltd.); and
Dye 2: blue light absorber, FDB-002 (absorption wavelength: 431 nm; Yamada Chemical Co., Ltd.)
[Evaluation Method]
<Photochromic Properties>

Photochromic cured bodies obtained in Examples and Comparative Examples were evaluated in the following manner.

A spectrophotometer (instantaneous multichannel photodetector, MCPD3000) manufactured by Otsuka Electronics Co., Ltd. was used to measure the following values:

Maximum absorption wavelength (λmax): the maximum absorption wavelength after color development;

Color optical density: the difference between the absorbance ($A_{300}$) after light irradiation at 23° C. for 300 seconds and the absorbance ($A_0$) before light irradiation at the maximum absorption wavelength; and Fading half-life [$\tau_{1/2}$ (sec)]: the time required for the absorbance of the sample at the maximum absorption wavelength to decrease to ½ of {$A_{300}$-$A_0$} when light irradiation at 23° C. for 300 seconds was stopped.
<Durability>

Residual ratio (%)=[($A_{96}$)/($A_0$)×100]: the ratio ($A_{96}$/$A_0$) of the color optical density ($A_{96}$) of a photochromic cured body after being subjected to an accelerated deterioration test to the color optical density ($A_0$) of the photochromic cured body before the test. In the accelerated deterioration test, the photochromic cured body was deteriorated at an accelerated rate for 96 hours by using Xenon weather meter $X^{25}$ manufactured by Suga Test Instruments Co., Ltd. The residual ratio was defined as an indicator of color durability. The higher the residual ratio, the better the color durability.

Example 18

A photochromic curable composition was prepared by mixing the respective components as shown in Table 1.

The thus-prepared photochromic curable composition was sufficiently defoamed, and then injected into a glass mold with a 2-mm gap, followed by cast polymerization of the photochromic curable composition. The cast polymerization was performed in an air furnace for 18 hours by gradually increasing the temperature from 27° C. to 120° C. After the polymerization, a cured body was removed from the glass mold. Thus, a photochromic cured body (photochromic optical article) with a thickness of 2 mm was obtained. The results of evaluating the photochromic cured body are shown in Tables 1 to 4.

Examples 19 to 48, Comparative Example 1

Photochromic cured bodies were produced in the same manner as in Example 18, except that formulations were changed as shown in Tables 1 to 4, followed by evaluations. The evaluation results are shown in Tables 1 to 4 following Example 18.

Example 49

A photochromic curable composition was prepared by mixing the respective components as shown in Table 4.

Then, the thus-prepared photochromic curable composition was sufficiently defoamed, and then injected into a mold with a 1-mm gap that is composed of a glass plate and a thiourethane-based plastic lens with a refractive index of 1.60, followed by cast polymerization of the photochromic curable composition. The cast polymerization was performed in an air furnace for 18 hours by gradually increasing the temperature from 27° C. to 120° C. for curing. After the polymerization, the glass plate was removed. Thus, a bonded-type photochromic optical article was obtained in which a photochromic cured body with a thickness of 1 mm was laminated on the surface of the thiourethane-based plastic lens with a refractive index of 1.60.

The thus-obtained photochromic optical article was evaluated for photochromic properties and durability in the same manner as in Example 18; the evaluation results are shown in Table 4.

Example 50

A photochromic curable composition was prepared by mixing the respective components as shown in Table 4.

Then, the thus-prepared photochromic curable composition was used as an adhesive for joining a pair of glass plates for optical articles so as to produce a photochromic optical article. First, the photochromic curable composition was applied to one of the glass plates for optical articles provided with a 0.1 mm-thick spacer, and the other glass plate for optical articles was placed thereon, followed by polymerization of the photochromic curable composition. The polymerization was performed in an air furnace for 18 hours by gradually increasing the temperature from 27° C. to 120° C. for curing so that the paired plates for optical articles were joined together. Thus, a glass bonded-type photochromic optical article was obtained that had a photochromic layer with a thickness of 0.1 mm.

The thus-obtained photochromic optical article was evaluated for photochromic properties and durability in the same manner as in Example 18; the evaluation results are shown in Table 4.

TABLE 1

| | Composition (parts by mass) | | | | | Photochromic properties (23° C.) | | | Durability |
| | | | | | | | | | |
| | Component A | Component B | Component C | Component D | Component E | Other compounding ingredients | $\lambda_{max}$ (nm) | Color optical density | $\tau_{1/2}$ (sec) | Residual ratio (%) |
|---|---|---|---|---|---|---|---|---|---|---|
| Example 18 | PC1 (0.1) | H6XDI (41) | TMMP (54) | Compound 7a (5) | E1 (0.05) | HP (0.1) | 575 | 0.35 | 290 | 78 |
| Example 19 | PC1 (0.1) | H6XDI (41) | PEMP (54) | Compound 7a (5) | E1 (0.05) | HP (0.1) | 575 | 0.40 | 140 | 85 |
| Example 20 | PC1 (0.1) | H6XDI (41) | DPMP (54) | Compound 7a (5) | E1 (0.05) | HP (0.1) | 575 | 0.40 | 105 | 92 |
| Example 21 | PC1 (0.1) | H6XDI (40) | DPMP (50) | Compound 7a (10) | E1 (0.05) | HP (0.1) | 575 | 0.65 | 75 | 90 |
| Example 22 | PC1 (0.1) | H6XDI (37) | DPMP (48) | Compound 7a (15) | E1 (0.05) | HP (0.1) | 575 | 0.86 | 60 | 85 |
| Example 23 | PC1 (0.1) | H6XDI (38) | DPMP (42) | Compound 7a (20) | E1 (0.05) | HP (0.1) | 575 | 0.90 | 50 | 77 |
| Example 24 | PC1 (0.1) | H6XDI (37) | DPMP (38) | Compound 7a (25) | E1 (0.05) | HP (0.1) | 575 | 0.95 | 45 | 68 |

TABLE 2

| | Composition (parts by mass) | | | | | Photochromic properties (23° C.) | | | Durability |
|---|---|---|---|---|---|---|---|---|---|
| | Component A | Component B | Component C | Component D | Component E | Other compounding ingredients | $\lambda_{max}$ (nm) | Color optical density | $\tau_{1/2}$ (sec) | Residual ratio (%) |
| Example 25 | PC1 (0.1) | H6XDI (37) | DPMP (48) | Compound 8a (15) | E1 (0.05) | HP (0.1) | 575 | 0.60 | 160 | 88 |
| Example 26 | PC1 (0.1) | H6XDI (37) | DPMP (48) | Compound 9a (15) | E1 (0.05) | HP (0.1) | 575 | 0.66 | 95 | 90 |
| Example 27 | PC1 (0.1) | H6XDI (38) | PEMP (47) | Compound 9a (15) | E1 (0.05) | HP (0.1) | 575 | 0.66 | 115 | 85 |
| Example 28 | PC1 (0.1) | H6XDI (38) | TMMP (47) | Compound 9a (15) | E1 (0.05) | HP (0.1) | 575 | 0.60 | 270 | 80 |
| Example 29 | PC1 (0.1) | H6XDI (38) | TMMP (47) | Compound 10a (15) | E1 (0.05) | HP (0.1) | 575 | 0.86 | 95 | 82 |
| Example 30 | PC1 (0.1) | H6XDI (38) | TMMP (47) | Compound 11a (15) | E1 (0.05) | HP (0.1) | 575 | 0.88 | 86 | 85 |
| Example 31 | PC1 (0.1) | H6XDI (38) | PEMP (47) | Compound 11a (15) | E1 (0.05) | HP (0.1) | 575 | 0.94 | 50 | 86 |
| Example 32 | PC1 (0.1) | H6XDI (37) | DPMP (48) | Compound 11a (15) | E1 (0.05) | HP (0.1) | 575 | 0.95 | 48 | 88 |

TABLE 3

| | Composition (parts by mass) | | | | | Photochromic properties (23° C.) | | | Durability |
|---|---|---|---|---|---|---|---|---|---|
| | Component A | Component B | Component C | Component D | Component E | Other compounding ingredients | $\lambda_{max}$ (nm) | Color optical density | $\tau_{1/2}$ (sec) | Residual ratio (%) |
| Example 33 | PC1 (0.1) | H6XDI (37) | DPMP (48) | Compound 12a (15) | E1 (0.05) | HP (0.1) | 575 | 0.95 | 45 | 88 |
| Example 34 | PC1 (0.1) | XDI (38) | PEMP (47) | Compound 12a (15) | E1 (0.05) | HP (0.1) | 575 | 0.99 | 53 | 84 |
| Example 35 | PC1 (0.1) | H6XDI (37) | DPMP (48) | Compound 13a (15) | E1 (0.05) | HP (0.1) | 575 | 0.97 | 40 | 90 |
| Example 36 | PC1 (0.1) | IPDI (37) | DPMP (48) | Compound 13a (15) | E1 (0.05) | HP (0.1) | 575 | 0.88 | 55 | 90 |
| Example 37 | PC1 (0.1) | H6XDI (37) | DPMP (48) | Compound 14a (15) | E1 (0.05) | HP (0.1) | 575 | 0.95 | 45 | 88 |
| Example 38 | PC1 (0.1) | NBDI (38) | PEMP (47) | Compound 14a (15) | E1 (0.05) | HP (0.1) | 575 | 0.95 | 46 | 88 |
| Example 39 | PC1 (0.1) | IPDI (37) | DPMP (48) | Compound 14a (15) | E1 (0.05) | HP (0.1) | 575 | 0.87 | 60 | 87 |
| Example 40 | PC1 (0.1) | XDI (37) | DPMP (48) | Compound 14a (15) | E1 (0.05) | HP (0.1) | 575 | 0.99 | 50 | 84 |
| Example 41 | PC1 (0.1) | H6XDI (37) | DPMP (48) | Compound 15a (15) | E1 (0.05) | HP (0.1) | 575 | 0.96 | 43 | 88 |
| Example 42 | PC1 (0.1) | H6XDI (37) | DPMP (48) | Compound 16a (15) | E1 (0.05) | HP (0.1) | 575 | 0.95 | 45 | 88 |

TABLE 4

| | Composition (parts by mass) | | | | | Photochromic properties (23° C.) | | | Durability |
|---|---|---|---|---|---|---|---|---|---|
| | Component A | Component B | Component C | Component D | Component E | Other compounding ingredients | $\lambda_{max}$ (nm) | Color optical density | $\tau_{1/2}$ (sec) | Residual ratio (%) |
| Example 43 | PC1 (0.1) | H6XDI (37) | DPMP (48) | Compound 17a (15) | E1 (0.05) | HP (0.1) | 575 | 0.95 | 42 | 88 |
| Example 44 | PC1 (0.1) | H6XDI (37) | DPMP (48) | Compound 18a (15) | E1 (0.05) | HP (0.1) | 575 | 0.92 | 52 | 87 |
| Example 45 | PC1 (0.1) | H6XDI (37) | DPMP (48) | Compound 19a (15) | E1 (0.05) | HP (0.1) | 575 | 0.95 | 45 | 88 |
| Example 46 | PC1 (0.1) | H6XDI (37) | DPMP (48) | Compound 20a (15) | E1 (0.05) | HP (0.1) | 575 | 0.86 | 58 | 86 |

TABLE 4-continued

| | Composition (parts by mass) | | | | | Other compounding ingredients | Photochromic properties (23° C.) | | | Durability |
| | Component A | Component B | Component C | Component D | Component E | | $\lambda_{max}$ (nm) | Color optical density | $\tau_{1/2}$ (sec) | Residual ratio (%) |
|---|---|---|---|---|---|---|---|---|---|---|
| Example 47 | PC1 (0.1) | H6XDI (37) | DPMP (48) | Compound 21a (15) | E1 (0.05) | HP (0.1) | 575 | 0.86 | 65 | 84 |
| Example 48 | PC1 (0.1) | H6XDI (37) | DPMP (48) | Compound 22a (15) | E1 (0.05) | HP (0.1) | 575 | 0.90 | 43 | 88 |
| Example 49 | PC1 (0.2) | H6XDI (37) | DPMP (48) | Compound 14a (15) | E1 (0.05) | HP (0.1) | 575 | 0.92 | 50 | 88 |
| Example 50 | PC1 (2) | H6XDI (37) | DPMP (48) | Compound 14a (15) | E1 (0.05) | HP (0.5) | 575 | 0.92 | 50 | 90 |
| Comparative Example 1 | PC1 (0.1) | H6XDI (42) | TMMP (53) | TDMP (5) | E1 (0.05) | HP (0.1) | 575 | 0.28 | >300 | 74 |

<Production of Acrylic Curable Composition and Cured Body>
<Photochromic Compound (Component A)>
  PC1.
<Polymerizable Monomer Component>
  Compound (23a);
  Polyethylene glycol dimethacrylate (average molecular weight: 736);
  Polyethylene glycol dimethacrylate (average molecular weight: 536);
  Trimethylolpropane trimethacrylate;
  γ-methacryloyloxypropyltrimethoxysilane;
  Glycidyl methacrylate; and
  pr2: polyrotaxane synthesized by the method described in WO 2018/235771, in which the axial molecule is formed of polyethylene glycol having a molecular weight of 11000; a bulky group at both ends is an adamantyl group; a cyclic molecule is α cyclodextrin; and 3.5 molecules on average of ε caprolactone are ring-opening polymerized via an oxypropylene group.
  The following are the properties of pr2.
  Inclusion amount of a cyclodextrin: 0.25;
  Degree of side chain modification: 0.5;
  Side chain molecular weight: about 100 on average;
  Molecular weight of chain having polymerizable group (acrylic group): about 650 on average (excluding polymerizable group); and
  Weight average molecular weight: 200000.
  This shows that pr2 has a structure in which acrylic groups as polymerizable groups are introduced into 50% of the side chains, and OH groups are present at the end of 50% of the side chains. Further, $^1$H-NMR measurement proves that a chain having about 140 polymerizable groups (acrylic groups) on average in one molecule is introduced.
<Curing Accelerator (Component E)>
  Irgacure 819:
  phenylbis(2,4,6-trimethylbenzoyl) phosphine oxide (polymerization initiator manufactured by BASF Japan Ltd.)

<Other Compounding Ingredients>
  HP (stabilizer): ethylenebis(oxyethylene)bis[3-(5-tert-butyl-4-hydroxy-m-tolyl) propionate]

Examples 51 and 52, Comparative Example 2

Photochromic curable compositions were prepared by mixing the respective components based on the formulations shown in Table 5. Next, a thiourethane-based plastic lens having a central thickness of 2 mm and a refractive index of 1.60 was prepared as an optical base material. Note that the thiourethane-based plastic lens was subjected in advance to alkali etching at 50° C. for 5 minutes with a 10% aqueous sodium hydroxide solution, followed by sufficient washing with distilled water.

The surface of the aforementioned plastic lens was coated with a moisture-curable primer (product name: TR-SC-P, manufactured by Tokuyama Corporation) by using a spin coater (1H-DX2 manufactured by Mikasa Co., Ltd.) at a rotation speed of 70 rpm for 15 seconds and then at 1000 rpm for 10 seconds. Thereafter, the lens was spin-coated with about 2 g of each of the photochromic compositions obtained above at a rotation speed of 60 rpm for 40 seconds and then at 600 rpm for 10 to 20 seconds so that the photochromic coating layer had a film thickness of 40 μm.

The lens whose surface was coated with the coating agent as described above was irradiated with light for 90 seconds by using a metal halide lamp having a power of 200 mW/cm$^2$ in a nitrogen gas atmosphere until the coating film was cured. Thereafter, the lens was further heated at 110° C. for one hour, thereby providing a photochromic optical article in which the surface of the plastic lens was coated with the photochromic cured body.

The thus-obtained photochromic optical article was evaluated for photochromic properties and durability in the same manner as in Example 18; the evaluation results are shown in Table 5.

TABLE 5

| | Composition (parts by mass) | | | Other compounding agents | Photochromic properties (23° C.) | | | Durability |
| | Component A | Polymerizable monomer component | Component E | | $\lambda_{max}$ (nm) | Color optical density | $\tau_{1/2}$ (sec) | Residual ratio (%) |
|---|---|---|---|---|---|---|---|---|
| Ex.*51 | PC1 (2) | Compound 23a (100) | Irgacure 819 (0.3) | HP (3) | 575 | 0.97 | 29 | 78 |

TABLE 5-continued

| | | Composition (parts by mass) | | Photochromic properties (23° C.) | | | Durability |
|---|---|---|---|---|---|---|---|
| | Component A | Polymerizable monomer component | Component E | Other compounding agents | $\lambda_{max}$ (nm) | Color optical density | $\tau_{1/2}$ (sec) | Residual ratio (%) |
| Ex. 52 | PC1 (2) | Polyethylate glycol dimethacrylate (average molecular weight: 736) (45) Polyethylate glycol dimethacrylate (average molecular weight: 536) (7) Trimethylolpropane trimethacrylate (40) γ-methacryloyloxypropyltrimethoxysilane (2) Glycidyl methacrylate (1) Compound 23a (5) | Irgacure 819 (0.3) | HP (3) | 575 | 0.90 | 30 | 80 |
| Compar. Ex.**2 | PC1 (2) | Polyethylate glycol dimethacrylate (average molecular weight: 736) (45) Polyethylate glycol dimethacrylate (average molecular weight: 536) (7) Trimethylolpropane trimethacrylate (40) γ-methacryloyloxypropyltrimethoxysilane (2) Glycidyl methacrylate (1) pr2 (5) | Irgacure 819 (0.3) | HP (3) | 575 | 0.84 | 48 | 74 |

*Example;
**Comparative Example

Example 53

Synthesis of Compound (24a)

Compound (14a) (6.5 g; 1.0 mmol) synthesized in Example 8 and toluenesulfonic acid monohydrate (0.076 g; 0.4 mmol) were dissolved in 50 mL of dry toluene, to which 3-mercaptopropionic acid (0.47 g; 4.4 mmol) was added, followed by heating and refluxing at 130 degrees for 10 hours, whereby the mixture was dehydrated and condensed. After the reaction, the solvent was distilled off under reduced pressure, and the residue was dissolved in dichloromethane. Thereafter, an organic layer was washed with 1% aqueous ammonia, followed by washing three times with ion-exchanged water. Then, the organic layer was dried over magnesium sulfate, and the solvent was distilled off under reduced pressure to give Compound (24a) (yield: 92%).

For Compound (24a), the proton nuclear magnetic resonance spectrum was measured. The following peaks were observed:

δ 1.14 (m; 192H), 2.68 to 2.81 (m; 16H), 3.40 to 3.70 (m; 416H), and 4.10 (m; 8H).

Example 54

Synthesis of Compound (25a)

Compound (14a) (6.5 g; 1.0 mmol) synthesized in Example 8 was dissolved in 50 mL of dry tetrahydrofuran, to which 60% sodium hydride (0.24 g; 6.0 mmol) was added, followed by stirring at room temperature for one hour. The stirred solution was added with epichlorohydrin (0.56 g; 6.0 mmol), followed by stirring at room temperature for 15 hours. After the reaction, the solvent was distilled off under reduced pressure, and the residue was dissolved in dichloromethane. Thereafter, an organic layer was washed three times with ion-exchanged water. Then, the organic layer was dried over magnesium sulfate, and the solvent was distilled off under reduced pressure to give Compound (25a). Proton nuclear magnetic resonance spectrum analysis showed that the introduction rate of a glycidyl group was 70%.

Example 55

A photochromic curable composition was prepared by mixing the respective components based on the formulation shown in Table 6.

Then, the thus-prepared photochromic curable composition was sufficiently defoamed. The composition was used as an adhesive to produce a photochromic optical article having a polarizing film layer and a photochromic layer by a glass bonding method.

Specifically, a pair of glass plates for optical articles was prepared. One side of one of the glass plates for optical articles was spin-coated with an acrylic adhesive so that a coating film was formed. On this coating film, a polarizing film (thickness: 27 μm; luminous transmittance: 42.5%; polarization degree: 99.2%; gray color; polyvinyl alcohol base) was laminated. Then, the coating film was irradiated with UV through the glass plate so as to be cured. Thus, a first laminate was obtained in which one of the glass plates and the polarizing film were joined together through the acrylic adhesive layer.

Next, the photochromic curable composition was applied to the other glass plate for optical articles with a 0.1 mm-thick spacer provided at its end to form a coating film. On this coating film, the first laminate obtained in the above-described manner was laminated such that the polarizing film was in contact with the coating film.

Then, the coating film was cured, and a photochromic optical article was obtained in which the other glass plate and the polarizing film were joined together through the photochromic resin layer. The polymerization of the photochromic curable composition was performed in an air furnace for 18 hours by gradually increasing the temperature from 27° C. to 120° C. The film thickness of the photochromic resin layer was 0.1 mm.

The photochromic optical article thus obtained was evaluated for photochromic properties and durability in the same manner as in Example 18; the evaluation results are shown in Table 6.

Example 56

A photochromic cured body was produced in the same manner as in Example 18, except that the formulation was changed as shown in Table 6, followed by evaluations. The evaluation results are shown in Table 6.

Example 57

A photochromic cured body was produced in the same manner as in Example 49, except that the formulation was changed as shown in Table 6, followed by evaluations. The evaluation results are shown in Table 6.

Example 58

A photochromic cured body was produced in the same manner as in Example 50, except that the formulation was changed as shown in Table 6, followed by evaluations. The evaluation results are shown in Table 6.

Example 59

A photochromic cured body was produced in the same manner as in Example 55, except that the formulation was changed as shown in Table 6, followed by evaluations. The evaluation results are shown in Table 6.

Example 60

Synthesis of Compound (26a)

[CF 67]

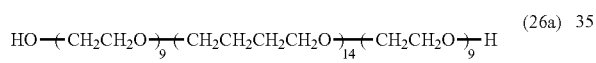

(26a)

Polyethylene glycol 400 (FUJIFILM Wako Pure Chemical Corporation; 16.0 g; 40.0 mmol) and imidazole (2.72 g; 40.0 mmol) were dissolved in 150 mL of dichloromethane, to which t-butyldimethylsilyl chloride (Sigma-Aldrich Co., LLC; 6.03 g; 40.0 mmol) was added, followed by stirring at room temperature for 15 hours. After the reaction, an organic layer was washed three times with water. The organic layer was dried over magnesium sulfate, and the solvent was distilled off under reduced pressure.

Then, the thus-obtained compound and triethylamine (4.05 g; 40.0 mmol) were dissolved in 150 mL of dichloromethane, to which p-toluenesulfonic acid chloride (Tokyo Chemical Industry Co., Ltd.; 7.63 g; 40.0 mmol) was added, followed by stirring at room temperature for 15 hours. After the reaction, the organic layer was washed three times with water. The organic layer was dried over magnesium sulfate, and the solvent was distilled off under reduced pressure (yield: 70%).

Next, sodium hydride (0.60 g; 25.0 mmol) was dispersed in dry THF (150 mL), to which polytetramethylene oxide 1000 (FUJIFILM Wako Pure Chemical Corporation; 12.5 g, 12.5 mmol) was added, followed by stirring at room temperature for 30 minutes. Thereafter, the compound obtained above (17.1 g; 25.0 mmol) was added to the mixture, followed by stirring at room temperature for five hours under a nitrogen atmosphere. After the completion of the reaction, ion-exchanged water was added to stop the reaction, and the mixture was extracted with dichloromethane. The organic layer was washed three times with water, and then the solvent was distilled off under reduced pressure. Then, the thus-obtained compound was dissolved in THF, to which tetrabutylammonium fluoride (1 mol/LTHF solution) (Tokyo Chemical Industry Co., Ltd.; 25.0 mL; 25.0 mmol) was added, followed by stirring at room temperature for 15 hours. After the reaction, the organic layer was washed three times with water. The organic layer was dried over magnesium sulfate, and the solvent was distilled off under reduced pressure to give Compound (26a) (yield: 85%).

For Compound (26a), the proton nuclear magnetic resonance spectrum was measured. The following peaks were observed:

δ 1.55 to 1.70 (m; 56H), and 3.40 to 3.70 (m; 128H).

Example 61

Synthesis of Compound (27a)

[CF 68]

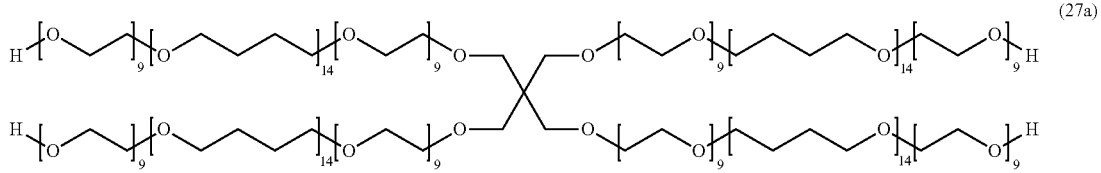

(27a)

Sodium hydride (0.60 g; 25.0 mmol) was dispersed in dry THF (150 mL), to which Compound (26a) (45.0 g; 25.0 mmol) synthesized in Example 60 was added, followed by stirring at room temperature for 30 minutes. Thereafter, pentaerythrityl tetrabromide (2.33 g; 6.0 mmol) was added to the mixture, followed by stirring at room temperature for four hours under a nitrogen atmosphere. After the completion of the reaction, ion-exchanged water was added to stop the reaction, and the mixture was extracted with dichloromethane. An organic layer was washed three times with water, and the solvent was distilled off under reduced pressure to give Compound (27a) (yield: 75%).

For Compound (27a), the proton nuclear magnetic resonance spectrum was measured. The following peaks were observed:

δ 1.55 to 1.70 (m; 224H), and 3.40 to 3.70 (m; 520H).

(Examples 62 and 63)

Photochromic cured bodies were produced in the same manner as in Example 18, except that the formulations were changed as shown in Table 6, followed by evaluations. The evaluation results are shown in Table 6.

Example 64

A photochromic cured body was produced in the same manner as in Example 49, except that the formulation was changed as shown in Table 6, followed by evaluations. The evaluation results are shown in Table 6.

Example 65

A photochromic cured body was produced in the same manner as in Example 50, except that the formulation was changed as shown in Table 6, followed by evaluations. The evaluation results are shown in Table 6.

Example 66

A photochromic cured body was produced in the same manner as in Example 55, except that the formulation was changed as shown in Table 6, followed by evaluations. The evaluation results are shown in Table 6.

Comparative Example 3

A photochromic cured body was produced in the same manner as in Comparative Example 1, except that the amount of TDMP was increased and the amounts of H6XDI and TMMP were decreased as shown in Table 6, followed by evaluations. The evaluation results are shown in Table 6.

Comparative Example 4

A photochromic cured body was produced in the same manner as in Example 18, except that Compound 7a was omitted and the amounts of H6XDI and TMMP were increased as shown in Table 6, followed by evaluations. The evaluation results are shown in Table 6.

INDUSTRIAL APPLICABILITY

The compound for optical materials, the curable composition, and the cured body of the present invention can be used for optical articles, such as a plastic lens, with photochromic properties.

The invention claimed is:

1. A compound for optical materials represented by Formula (Ia) below:

[CF 1]

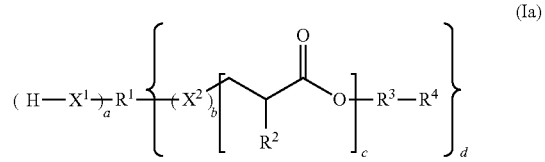

(Ia)

wherein $X^1$ and $X^2$ are each NH, S, or O;
$R^1$ is an alkylene group having 1 to 20 carbon atoms, Formula (4c), (4a), (4b), (5d), (5a), (5b), (6h), or (6a) below:

[CF2]

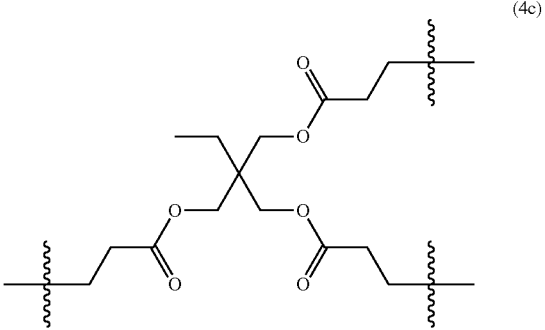

(4c)

TABLE 6

| | Composition (parts by mass) | | | | | Photochromic properties (23° C.) | | | Durability |
|---|---|---|---|---|---|---|---|---|---|
| | Component A | Component B | Component C | Component D | Component E | Other compounding ingredients | $\lambda_{max}$ (nm) | Color optical density | $\tau_{1/2}$ (sec) | Residual ratio (%) |
| Ex. 55 | PC1 (2) | H6XDI (42) | DPMP (44) | Compound 14a (14) | E1 (0.05) | HP (0.1) | 575 | 1.06 | 50 | 90 |
| Ex. 56 | PC1 (0.1) | H6XDI (37) | DPMP (48) | Compound 24a (15) | E1 (0.05) | HP (0.1); Dye 1 (0.005) | 575 | 0.92 | 50 | 88 |
| Ex. 57 | PC1 (0.2) | H6XDI (37) | DPMP (48) | Compound 24a (15) | E1 (0.05) | HP (0.1); Dye 1 (0.01) | 575 | 0.92 | 50 | 90 |
| Ex. 58 | PC1 (2) | H6XDI (37) | DPMP (48) | Compound 24a (15) | E1 (0.05) | HP (0.1); Dye 1 (0.6) | 575 | 0.92 | 50 | 90 |
| Ex. 59 | PC1 (2) | H6XDI (42) | DPMP (44) | Compound 24a (14) | E1 (0.05) | HP (0.1); Dye 1 (0.16) | 575 | 1.06 | 50 | 90 |
| Ex. 62 | PC1 (0.1) | H6XDI (37) | DPMP (48) | Compound 26a (15) | E1 (0.05) | HP (0.1); Dye 1 (0.005); Dye 2 (0.001) | 575 | 0.92 | 55 | 88 |
| Ex. 63 | PC1 (0.1) | H6XDI (37) | DPMP (48) | Compound 27a (15) | E1 (0.05) | HP (0.1); Dye 2 (0.01) | 575 | 0.94 | 52 | 89 |
| Ex. 64 | PC1 (0.2) | H6XDI (37) | DPMP (48) | Compound 27a (15) | E1 (0.05) | HP (0.1); Dye 2 (0.02) | 575 | 0.94 | 52 | 89 |
| Ex. 65 | PC1 (2) | H6XDI (37) | DPMP (48) | Compound 27a (15) | E1 (0.05) | HP (0.1); Dye 2 (0.2) | 575 | 0.94 | 52 | 89 |
| Ex. 66 | PC1 (2) | H6XDI (37) | DPMP (48) | Compound 27a (15) | E1 (0.05) | HP (0.1); Dye 2 (0.2) | 575 | 1.08 | 52 | 89 |
| Compar. Ex. 3 | PC1 (0.1) | H6XDI (38) | TMMP (37) | TDMP (25) | E1 (0.05) | HP (0.1) | 575 | 0.56 | 290 | 65 |
| Compar. Ex. 4 | PC1 (0.1) | H6XDI (42) | TMMP (58) | — | E1 (0.05) | HP (0.1) | 575 | 0.10 | >300 | 88 |

-continued

[CF3]

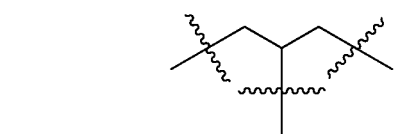
(4a)

[CF4]

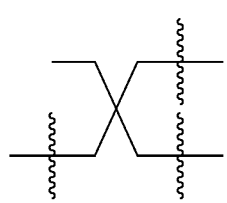
(4b)

[CF5]

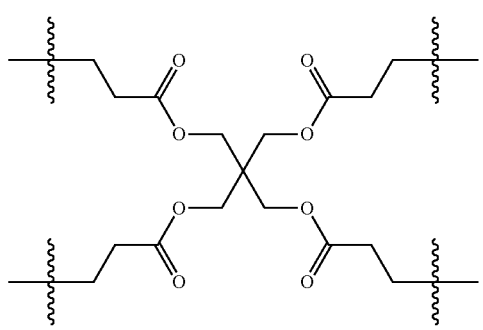
(5a)

[CF6]

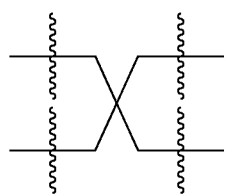
(5a)

[CF7]

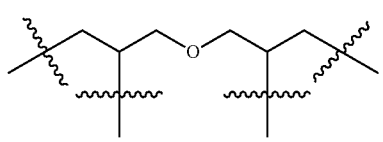

-continued

[CF 8]

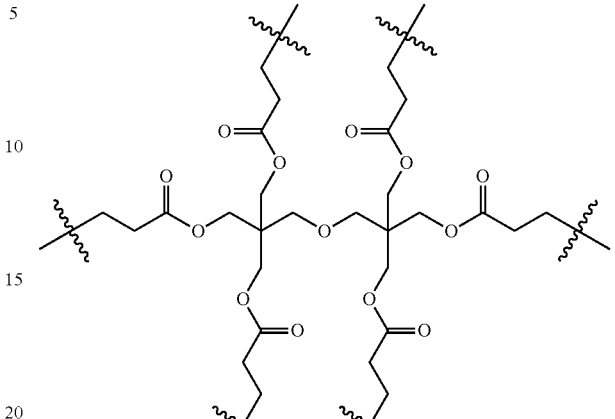
(6h)

[CF 9]

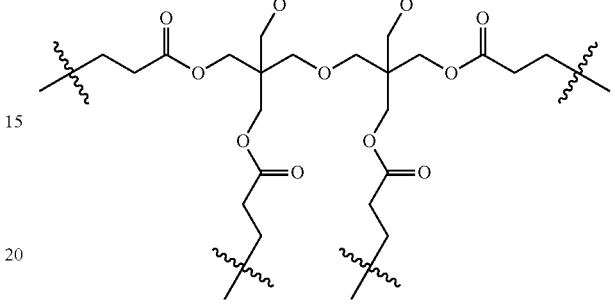
(6a)

$R^2$ is H or $CH_3$;
$R^4$ is H,
$H_2C{=}CH{-}C({=}O){-}$, or
$H_2C{=}C(CH_3){-}C({=}O){-}$;
"a" is 0; "b" is 1; "c" is 0 or 1; "d" is 2, 3, 4, or 6;
$R^3$ is a group comprising a block copolymer represented by Formula (IIa) below:

$$-(CH_2CH_2O)_x-(CH_2CH(CH_3)O)_y-(CH_2CH_2O)_z- \quad (IIa)$$

wherein "x" is an integer of 5 to 20, "y" is an integer of 5 to 40, and "z" is an integer of 1 to 20.

2. The compound for optical materials according to claim 1, wherein $R^1$ is an organic residue selected from Formulas (4c), (4b), (5d), (5a), (6h), or (6a) below:

[CF 10]

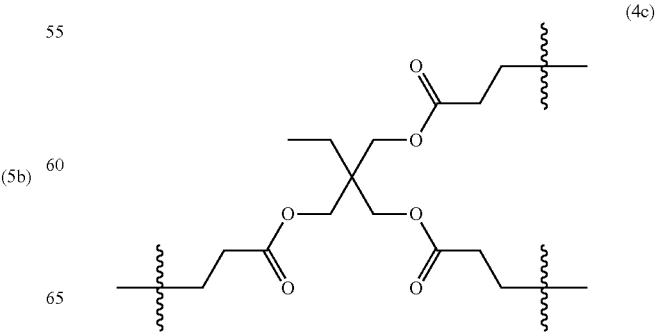
(4c)

[CF 11]

(4b)

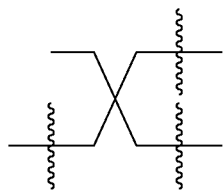

[CF 12]

(5d)

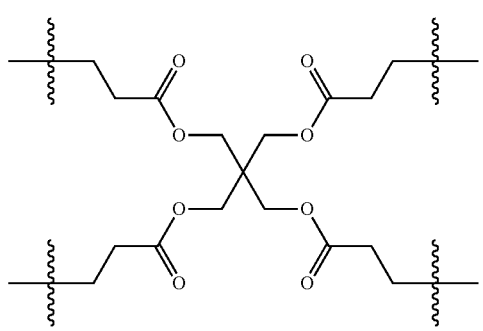

[CF 13]

(5a)

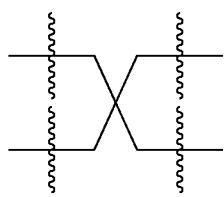

[CF 14]

(6h)

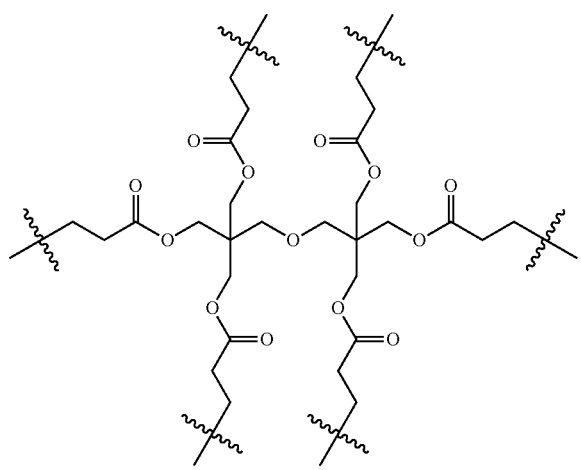

[CF 15]

(6a)

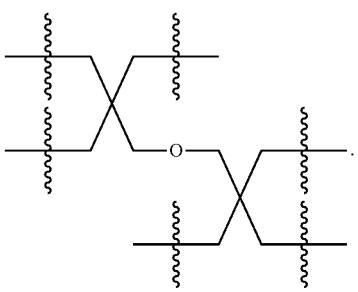

3. A curable composition comprising: a compound for optical materials (Component D) according to claim 1; and at least one compound (Component B) selected from a polyisocyanate compound and a polyisothiocyanate compound.

4. The curable composition comprising a compound for optical materials (Component D) according to claim 3, wherein $R^4$ in Formula (Ia) is $H_2C=CH-C(=O)-$ or $H_2C=C(CH_3)-C(=O)-$.

5. The curable composition according to claim 3, further comprising a photochromic compound (Component A).

6. A cured body obtained by curing a curable composition according to claim 3.

7. An optical article comprising a cured body according to claim 6.

8. The compound for optical materials according to claim 1, wherein in the block copolymer, the first polymer is located to face $R^1$ via the second polymer.

9. A curable composition comprising: a compound for optical materials (Component D) according to claim 2; and at least one compound (Component B) selected from a polyisocyanate compound and a polyisothiocyanate compound.

10. The curable composition according to claim 4, further comprising a photochromic compound (Component A).

11. A cured body obtained by curing a curable composition according to claim 4.

12. A cured body obtained by curing a curable composition according to claim 5.

\* \* \* \* \*